(12) United States Patent
Zhang et al.

(10) Patent No.: US 8,972,396 B1
(45) Date of Patent: Mar. 3, 2015

(54) SYSTEM AND METHODS FOR DETERMINING RELEVANCE BETWEEN TEXT CONTENTS

(71) Applicant: Guangsheng Zhang, Palo Alto, CA (US)

(72) Inventors: Guangsheng Zhang, Palo Alto, CA (US); Chizhong Zhang, Palo Alto, CA (US)

( * ) Notice: Subject to any disclaimer, the term of this patent is extended or adjusted under 35 U.S.C. 154(b) by 55 days.

(21) Appl. No.: 13/655,415

(22) Filed: Oct. 18, 2012

Related U.S. Application Data

(63) Continuation-in-part of application No. 13/399,050, filed on Feb. 17, 2012, now Pat. No. 8,370,347, which is a continuation of application No. 12/699,193, filed on Feb. 3, 2010, now Pat. No. 8,140,526.

(60) Provisional application No. 61/160,625, filed on Mar. 16, 2009, provisional application No. 61/682,205, filed on Aug. 11, 2012.

(51) Int. Cl.
*G06F 7/02* (2006.01)
*G06F 17/30* (2006.01)

(52) U.S. Cl.
USPC ............ 707/731; 707/730; 707/738; 707/750

(58) Field of Classification Search
CPC .................... G06F 17/30616; G06F 17/30705; G06F 17/30734; G06F 17/30011; G06F 17/30
See application file for complete search history.

(56) References Cited

U.S. PATENT DOCUMENTS

| | | | |
|---|---|---|---|
| 5,907,836 A * | 5/1999 | Sumita et al. | 707/754 |
| 5,930,788 A | 7/1999 | Wical | |
| 6,101,515 A | 8/2000 | Wical | |
| 6,487,545 B1 | 11/2002 | Wical | |
| 2002/0042792 A1* | 4/2002 | Nishioka et al. | 707/5 |
| 2003/0220922 A1* | 11/2003 | Yamamoto et al. | 707/7 |
| 2005/0192934 A1* | 9/2005 | Ellis et al. | 707/3 |
| 2006/0167931 A1* | 7/2006 | Bobick et al. | 707/102 |
| 2006/0184566 A1* | 8/2006 | Lo et al. | 707/102 |
| 2009/0307003 A1* | 12/2009 | Benyamin et al. | 705/1 |

* cited by examiner

*Primary Examiner* — Bruce Moser

(57) ABSTRACT

The present application discloses a computer-assisted method for determining relevance between a first text content and a second text content, and displaying relevant contents.

20 Claims, 12 Drawing Sheets

User customized search.
Please select desirable content characteristics of the search results:

| Terms | Parts of Speech | Grammatical Roles | Semantic Roles | Frequency Count |
|---|---|---|---|---|
| Computer | 0.002 | 0.0003 | 0.05 | 0.0004 |
| CPU | 0.001 | 0.0004 | 0.002 | 0.0002 |
| Memory | 0.004 | 0.0006 | 0.054 | 0.0003 |
| Hard disk | 0.006 | 0.0003 | 0.056 | 0.0004 |
| Software | 0.002 | 0.0003 | 0.058 | 0.0006 |
| …… | | | | |

Figure 10

SYSTEM AND METHODS FOR DETERMINING RELEVANCE BETWEEN TEXT CONTENTS

CROSS REFERENCES TO RELATED APPLICATIONS

The present application is a continuation-in-part application of and claims priority to U.S. patent application Ser. No. 13/399,050, titled "System and methods for ranking documents based on content characteristics", filed Feb. 17, 2012. U.S. patent application Ser. No. 13/399,050 is a continuation application of and claims priority to U.S. patent application Ser. No. 12/699,193, titled "System and methods for ranking documents based on content characteristics", filed by the same inventor on Feb. 3, 2010. U.S. patent application Ser. No. 12/699,193 further claims priority to Provisional Patent Application 61/160,625, titled "System, methods, user interface, and article of manufacture for scalable knowledge-based document topic discovery, content recognition, search, ranking, and categorization" filed on Mar. 16, 2009 by the present inventor. The present application also claims priority to U.S. Provisional Patent Application 61/682,205 titled "System and methods for determining term importance and relevance between text contents using conceptual association datasets" filed Aug. 11, 2012. The disclosures of the above applications are incorporated herein by reference.

BACKGROUND OF INVENTION

In conventional keyword-based search, relevance is often determined by keyword matching between queries and candidate documents. However, as is well known, keyword matching alone often cannot produce accurate results. One example of such a drawback is with synonyms. For example, if a query is about "car", documents containing information about cars in which the author only uses the word "auto" would probably not be considered as relevant to the query.

Another problem with conventional search is with similar document search. For example, in patent search, either for prior art search or infringement search, using simple query strings is not an effective way to find certain potentially related or similar patents. For this purpose, a comparison of relevancy between two or more patents or documents in general is needed. However, even when a search engine allows for document-based search, the conventional keyword-match method still cannot produce optimal results due to the problem similar to using synonyms and the alike. Using a thesaurus is one solution, but it is still limited by the quality and scope of the thesaurus, which itself is word-based rather than concept-based.

Another example of the keyword-matching problem is with the so-called context-based advertising. An example at the current time is the prevailing Internet advertising method such as Google AdWords or AdSense. In essence, both methods require the advertiser to pre-define target keywords as the context for their advertisement, and what the search provider does is to match these target keywords to user queries or in the content of a website that is willing to display ads. While matching keywords provides a certain amount of context information, the effect of the advertisement is still limited because the relevance between a keyword and an advertisement is often not fully determined by the keywords. Better results can be achieved if the context is conceptually based. For example, if the query contains such words as "San Francisco hotels", ads from hotels in the SF area may be displayed. However, if the query contains such words as "stay in San Francisco", or "stay near Golden Gate Bridge", and if the hotel advertiser does not pre-define words such as "stay", etc., as relevant, their ads will not be displayed, even though they can be highly relevant to the context.

SUMMARY OF INVENTION

The present application discloses relevance determination and ranking methods based on a theoretical framework called the Object-Properties Associations Model for Knowledge and Linguistic Information developed by the present inventor. The presently disclosed methods compare document content with an object-specific knowledge data set related to the query term, and detect characteristics of the document content in relation to the query term, based on the distribution patterns of information-carrying components of the document, the knowledge about the content characteristics can then be used to provide a user with a plurality of options to meet the specific needs of the user, with user interface tools to enable the user to effectively locate the most relevant information the user is looking for. Furthermore, the present invention provides a system and methods for automatically and accurately determining relevance between two or more pieces of text contents by using conceptual association datasets without user intervention.

In a general aspect, the present invention relates to a computer-assisted method for determining relevance between a first text content and a second text content, and displaying relevant contents. The method includes receiving a conceptual association dataset specific to a concept by a computer system, the data set comprising a plurality of property terms associated with the concept, each property term having an association strength associated with the concept name; for each of the first terms in the first text content that matches a property term in the conceptual association dataset, incrementing a first cumulative term count by the computer system; selecting the first text content as a relevant content to the concept based on the first cumulative term count; for each of the second terms in the second text content that matches a property term in the conceptual association dataset, incrementing a second cumulative term count by the computer system; selecting the second text content as a relevant content to the concept based on the second cumulative term count; calculating a direct relevance score based on the first cumulative term count and the second cumulative term count to determine relevance between the first text content and the second text content; and identifying the first text content or the second text content as relevant content by the computer system if the direct relevance score meets a pre-determined criterion.

Implementations of the system may include one or more of the following. The first cumulative term count can be incremented by the number of times that one of the first terms matches a property term in the conceptual association dataset, wherein the second cumulative term count is incremented by the number of times that one of the second terms matches a property term in the conceptual association dataset. The first text content can be selected as a relevant content to the concept if the first cumulative term count is above a first pre-determined threshold, wherein the second text content can be selected as a relevant content to the concept if the second cumulative term count is above a second pre-determined threshold, wherein the first text content or the second text content can be identified as relevant content if the direct relevance score can be above a third pre-determined threshold. Each property term in the conceptual association dataset has an association strength value associated with the concept, wherein the step of incrementing a first cumulative term count can include: for each of the first terms that matches a property term in the conceptual association dataset, adding an association strength value associated with the property term to the first cumulative term count, wherein the step of incrementing a second cumulative term count comprises: for each of the second terms that matches a property term in the conceptual association dataset, adding an association strength value associated with the property term to the second cumulative term count. Each of the first terms can be associated with a first term importance score, wherein the step of incrementing a first cumulative term count can include: for each of the first terms that matches a property term in the conceptual association dataset, adding the first term importance score associated with the first term to the first cumulative term count, wherein the first term importance score can be calculated for each of the one or more first terms in the first text content based on frequency, parts of speech, grammatical role, or semantic role, or semantic attribute, or attribute value of each of the one or more first terms in the first text content, or a combination thereof. Each of the second terms can be associated with a second term importance score, wherein the step of incrementing a second cumulative term count can include: for each of the second terms that matches a property term in the conceptual association dataset, adding the second term importance score associated with the second term to the second cumulative term count, wherein the second term importance score can be calculated for each of the one or more second terms in the second text content based on frequency, parts of speech, grammatical role, or semantic role, or semantic attribute or attribute value of each of the one or more second terms in the second text content, or a combination thereof. Each property term in the conceptual association dataset can have an association strength value associated with the concept, wherein each of the first terms is associated with a first term importance score, wherein each of the second terms is associated with a second term importance score, wherein the step of incrementing a first cumulative term count can further include: for each of the first terms that matches a property term in the conceptual association dataset, incrementing the first cumulative term count by a first step value determined by an association strength value associated with the property term and the first term importance score associated with the first term, wherein the step of incrementing a second cumulative term count can further include: for each of the second terms that matches a property term in the conceptual association dataset, incrementing the second cumulative term count by a second step value determined by an association strength value associated with the property term and the second term importance score associated with the second term. Each property term in the conceptual association dataset can have an association strength value associated with the concept, wherein the property terms are divided into groups based on their association strength values being above or below a pre-determined threshold, wherein the first cumulative term count or the second cumulative term count can be incremented by a different value for the different groups that comprises the property term that matches the first term or the second term. The first text content can include user created content, and wherein the second text content comprises an advertisement, or a description or a keyword list associated with an advertisement. The method can further include: enabling display of the advertisement associated with the first text content on a computing device if the direct relevance score meets the pre-determined criterion. The user created content can include a search query, a webpage, a blog, an email, an SMS message, a transcript from an audio or text conversation, a user comment or chat message entered on a website or on a social network page, or in a user interface of a computing or communication device. The computing or communication device can include a desktop computer, a laptop computer, a mobile device, a hand-held device, a cloud-based device, or a mobile phone or a land phone. The advertisement can be displayed as a banner advertisement at a user interface, including a web user interface, a social network page, a chat screen, or an email interface, or as an audio message through an audio device. The first text content can include at least a portion of a patent or a patent publication or a patent draft or patent notes, and the second text content is another patent or a patent publication in a patent collection or database containing multiple or all searchable patents or patent publications, the method can further include: enabling display of the second text content in a user interface if the direct relevance score meets the pre-determined criterion. The first text content can include a search query, or a resume, or a job description, and the second text content is a resume or a job description, the method can further include: enabling display of the job description or resume in a user interface if the direct relevance score meets the pre-determined criterion. The first text content and the second text content can include one or more words, one or more phrases, one or more sentences, one or more paragraphs, a document, a note, an email, a patent, a news article, a blog, an SMS message, a transcript from an audio or text conversation, or a user comment on a social network, a chat screen, or an email interface, displayed on a computing or communication device. The computing or communication device can include a desktop computer, a laptop computer, a mobile device, a hand-held device, a cloud-based device, a mobile phone or a land phone. The first text content can include a collection of user generated contents, wherein the relevance score of associated with a concept association dataset is pre-calculated and stored in association with a user profile, wherein the second text content can be an advertisement, wherein the relevance score associated with the concept association dataset is pre-determined and stored on a computer system. The first text content can include a search query, and the second text content comprises a document associated with a search index. The method can further include: enabling display of the document or a link to the document in a user interface in response to the search query if the direct relevance score meets the pre-determined criterion. The first text content can be a collection of user generated contents, wherein the conceptual association dataset can represent a definition or a criterion of a document class or category or a topic of interest, the method can further include: associating the one or more text content in the collection with the document class or category or the topic of interest if the first cumulative term count meets the pre-determined criterion.

In another general aspect, the present invention relates to a computer system for determining relevance between a first text content and a second text content, and displaying relevant contents. The computer system include a computer processor that can receive a conceptual association dataset specific to a concept, the data set comprising a plurality of property terms associated with the concept, each property term having an association strength associated with the concept name, wherein the computer processor is configured to receive a first text content comprising user created content and to receive a second text content comprising an advertisement, or a description or a keyword list associated with an advertisement, wherein the computer processor is configured to increment a first cumulative term count for each of the first terms in the first text content that matches a property term in the conceptual association dataset, wherein the computer processor is configured to select the first text content as a relevant content to the concept based on the first cumulative term count, wherein the computer processor is configured to increment a second cumulative term count for each of the second terms in the second text content that matches a property term in the conceptual association dataset, wherein the computer processor is configured to select the second text content as a relevant content to the concept based on the second cumulative term count, wherein the computer processor is configured to calculate a direct relevance score based on the first cumulative term count and the second cumulative term count to determine relevance between the first text content and the second text content, and wherein the computer processor is configured to identify the first text content or the second text content as relevant content and to enable display of the advertisement associated with the first text content on a computing device if the direct relevance score meets a pre-determined criterion.

Implementations of the system may include one or more of the following. The user created content can include a search query, a webpage, a blog, an email, an SMS message, a transcript from an audio or text conversation, a user comment or chat message entered on a website or on a social network page, or in a user interface of a computing or communication device.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 10 is an example ETP dataset with hypothetical terms and their corresponding ETP score values.

DETAILED DESCRIPTION OF INVENTION

Given an object name as a search query, and the object-specific data set of a plurality of property terms and their corresponding object-dependent association strength values, the amount of information about the object in a document can be quantitatively assessed, and the quantitative measure of the information in the document can be used as a measure of the relevancy of the document to the search query for ranking the search results. Details about quantitative information assessment are disclosed in U.S. patent application Ser. No. 12/573,134, titled "System and Methods for Quantitative Assessment of Information in Natural Language Contents" filed on Oct. 4, 2009 by the present inventor, the disclosure of which is incorporated herein by reference.

In addition to the quantitative assessment of information contained in the document about the specific object as disclosed in the above referenced U.S. patent application Ser. No. 12/573,134, the presently disclosed system and methods can further quantitatively determine relevance between two or more documents or text contents of other formats.

Figure 1:
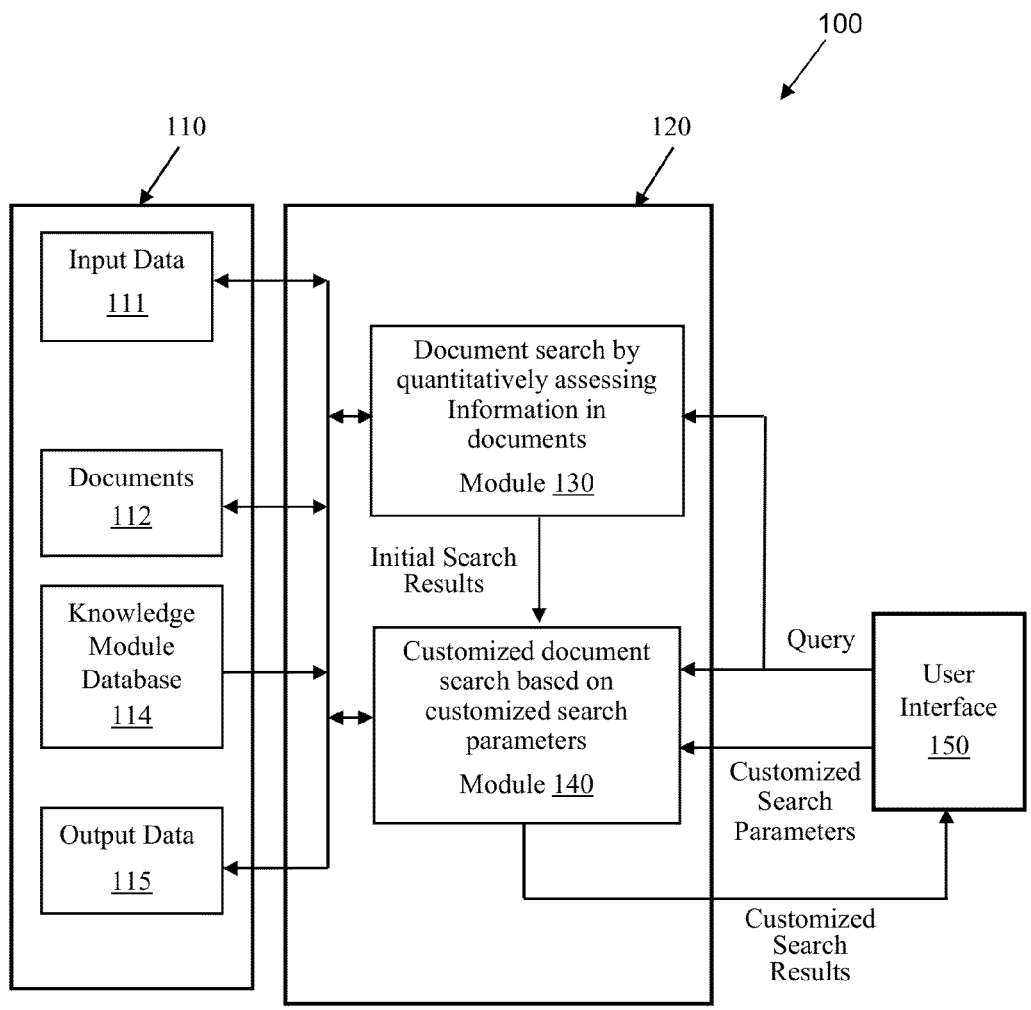
FIG. 1 is an exemplified system diagram in accordance with the present invention.

Referring to FIG. 1, a system 100 for document search/retrieval includes a computer storage system 110, a computer processing system 120, and a user interface 150. The computer storage system 110 can store input data 111. The computer storage system 110 stores a collection of documents 112 comprising one or more documents, a knowledge module database 114, and output data 115 that include search results. The computer storage system 110 can also include optionally a syntactic parser (not shown) to assist the operations of module 130 as described in detail in the above referenced U.S. patent application Ser. No. 12/573,134.

Figure 2:
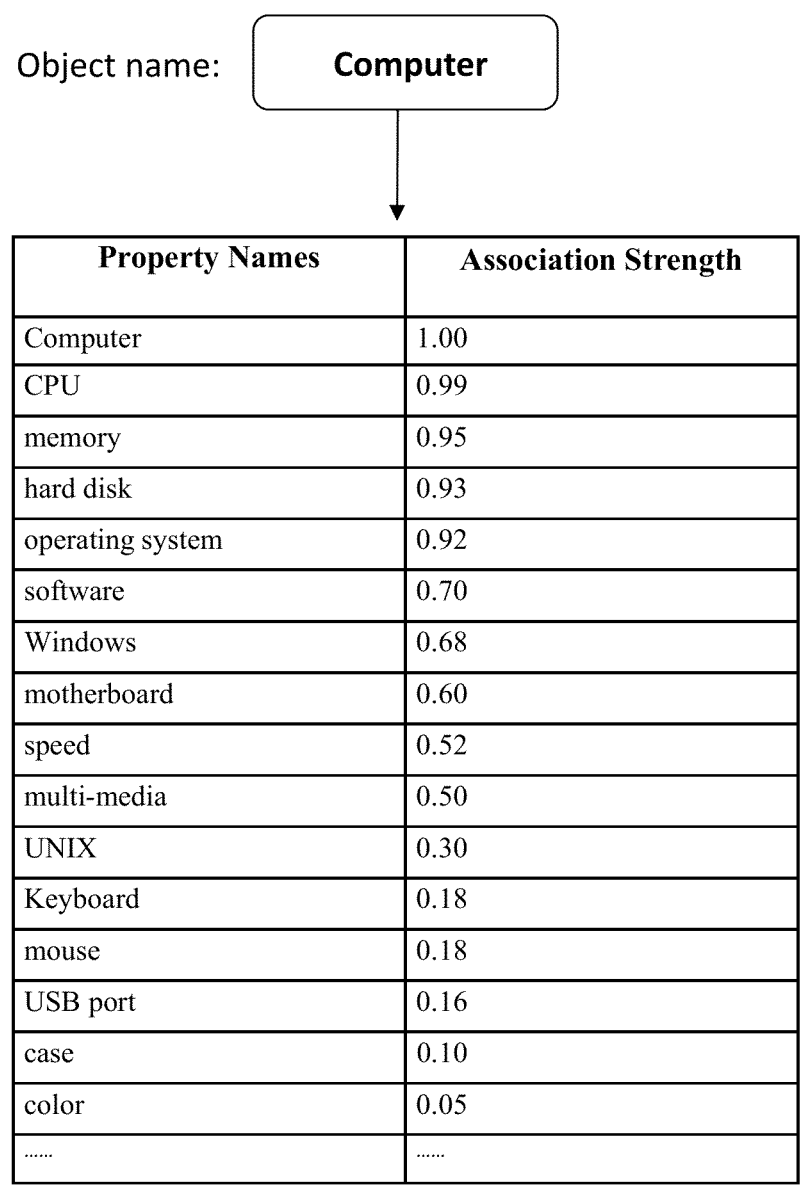
FIG. 2 illustrates an exemplified data table in a knowledge module.

The knowledge module database 114 can include a data table, as shown in FIG. 2, related to an object name defined in a query. In particular, the data table in FIG. 2 represents knowledge about the object of "computer". The object named "computer" is characterized by a plurality of associated properties such as "CPU", "memory", "hard disk", "operating system", "software", "windows", "motherboard", "speed", etc., that are associated with the object "computer". The prominence of the association between "computer" and each of the properties is characterized by a numerical value herein called association strength. Hypothetical values for the association strengths for "CPU", "memory", "hard disk", "operating system", can for example respectively be 0.99, 0.95, 0.93, and 0.92. A higher association strength value can represent a stronger association between the property and the object. The object "computer" can be uniquely defined by the associated properties and their respective association-strength values. The association-strength value for a property is specific to the object, and usually varies for different objects. For example, the property "color" may have an association-strength value of 0.8 for the object "flower", but an association-strength value of 0.05 for the object "computer". Moreover, the object "computer" can also be viewed as a property to itself with an association strength value equal to 1, or in some case a different value.

The computer processing system 120 can optionally include a functional module 130 that can quantitatively assess information in natural language contents in the documents using the same knowledge module, and can rank documents in the search result according to the quantitative measure of information in the documents. Detailed operations for the module 130 are disclosed in the above referenced U.S. patent application Ser. No. 12/573,134. For example, the query received from the user interface 150 can include an object name which can be in the form of a word, a list of words or a phrase, a character string, a sub-component of such string. A document stored in document 112 in the computer storage system 110 can be assessed to quantitatively determine its information content related to the object name in the query.

Each sentence in the documents can be parsed and tokenized. The association strengths of tokenized words can be determined using a data set stored in the knowledge module database 114. A sentence information index is calculated using the association strengths of tokenized words in the sentence. A document information index is calculated using the sentence information indices of the sentences in the document.

Figure 3:
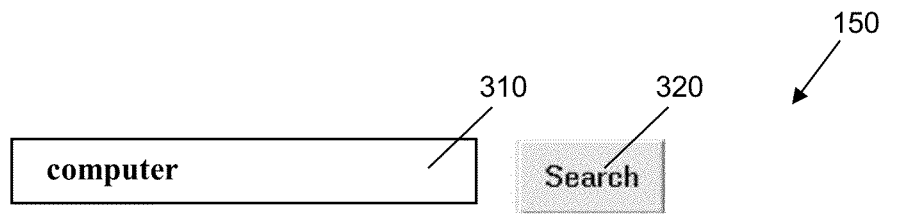
FIG. 3 illustrates an exemplified user interface for inputting customized ranking parameters.
Figure 3:
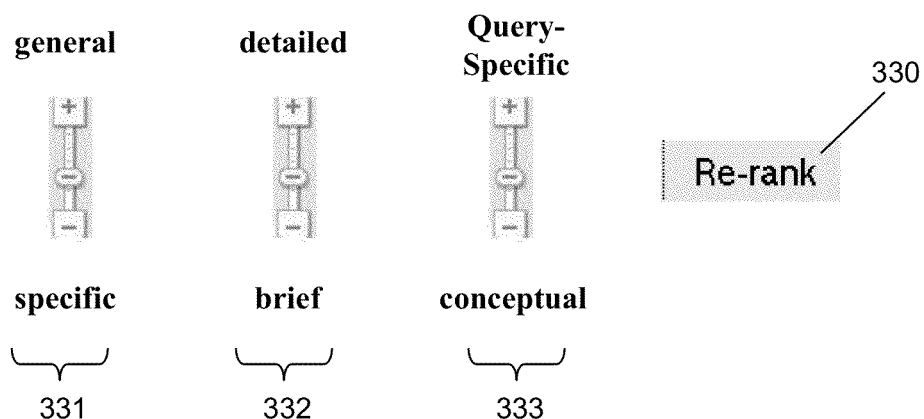
Figure 3:
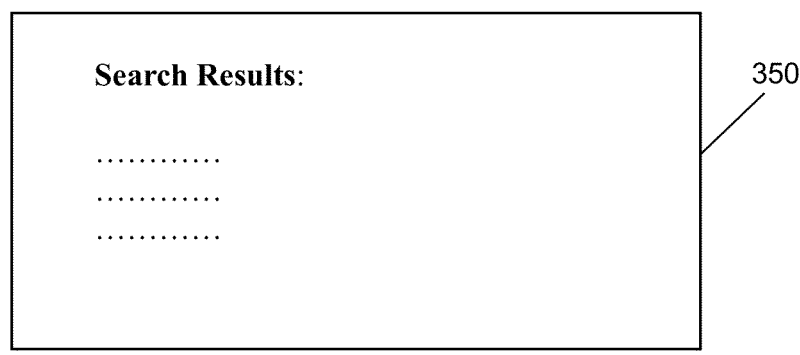

The user interface 150, as shown in FIG. 3, can include a data field 310 for receiving a query string, which can be or include an object name such as "computer". A search button 320 for a user to activate an initial search to be performed by the module 130. The user interface 150 also includes a plurality of controls 331-333 for receiving values of customized ranking parameters from the user. For example, the control 331 can be a slider that allows a user to indicate whether he or she wants contents with general (or specific) information related to the query to be ranked higher in the search results. The control 332 can be implemented as a slider that allows a user to select whether he or she wants the detailed or brief contents to be ranked higher in the search results. The control 333 can be implemented as a slider that allows a user to indicate whether he or she wants the contents that are specific to the query term or other contents that are conceptually related to the queried object to be ranked higher in the search results. The selections by the user using the controls 331-333 are translated to values of customized ranking parameters and sent to the computer processing system 120. Customized search results can be listed in an area 350 according to the document's information content as well as content characteristics indicated by the values of the customized ranking parameters input from the control 331, and/or the control 332, and/or the control 333.

Figure 4:
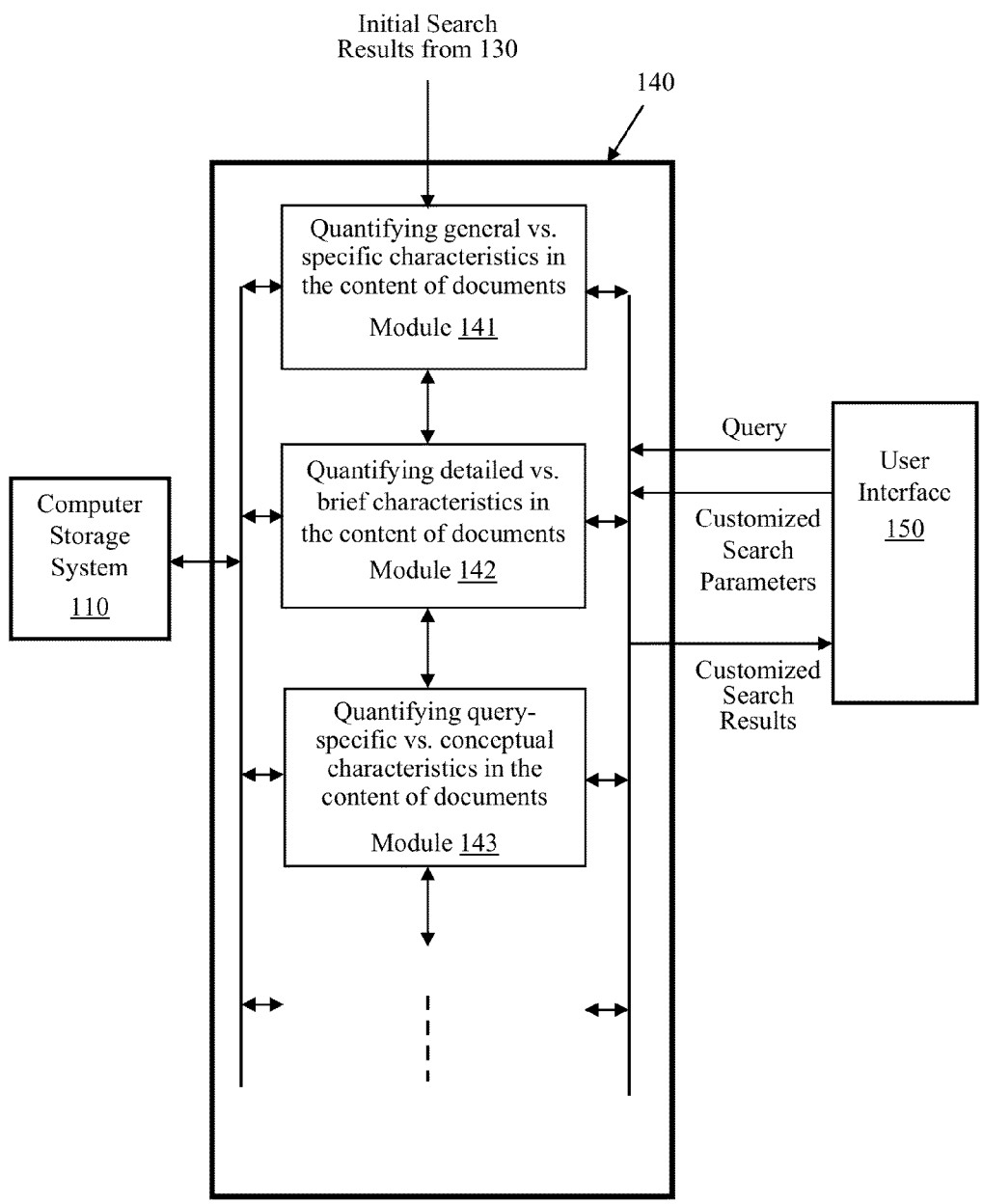
FIG. 4 illustrates details of a module for customized document search based on customized ranking parameters.

The computer processing system 120 includes a module 140 that can, as shown in FIG. 4, conduct customized searches and ranking of documents using the customized ranking parameters and a query received from the user at the user interface 150. The module 140 can conduct document content characteristics assessment and ranking for the documents stored in the computer storage system 110 or only for the documents in the initial search results obtained by the module 130. In other words, the module 140 can receive query directly from the user interface 150 and conduct customized search on documents stored in documents 112 using the data tables stored in the knowledge module database 114. An initial search by the module 130 is optional.

Referring to FIGS. 1 and 4, the module 140 can include a plurality of modules 141-143 for quantitatively assessing characteristics in the content of the documents. For example, the module 141 can quantitatively assess and determine a relevance score for each document based on how general or specific the information in the document is about the queried object. The module 142 can quantitatively assess and determine a relevance score for each document based on how detailed or brief the content of the document is in relation to the object name in the query. The module 143 can quantitatively assess and determine a relevance score for each document based on how much the content of the document is specifically about the queried object, or is only conceptually related to the queried object. The module 140 can also include other modules (e.g. 144 etc.) that can assess and rank documents based on other desirable content characteristics.

The modules 141-143 utilize the quantitative association strengths of the property terms related to an object name stored in the data tables as described above with reference to FIG. 2. The modules 141-143 quantitatively assess the characteristics of the content in a document by measuring distribution patterns of property terms in the document, based on research conducted by the present inventor that different content characteristics are related to different distribution patterns of property terms. A relevance score can be given to a document in relation to each content characteristic and for a specific object name. The raw documents in a document collection or in an initial search results can be ranked and re-ranked to provide the user with a more preferred or a shorter list of search results.

User Customized Search: General Vs. Specific Topics in Document Content

As described above in relation to the user interface control 331 (FIG. 3) and the module 141 (FIG. 4), a characteristic for a document content is how general or how specific the document's content is about the queried topic. An example of a general content versus a specific content is like the following.

If the query is about the object of "computer", a general content contains information about the general properties of the object computer, such as the properties of having a CPU, an operating system, can do mathematical calculations and text processing, etc. A specific content contains concentrated information about specific properties of the object, such as the CPU internal memory capacity, speed of the front bus on the motherboard, software device drivers, etc. When querying for information about the object of computer, different users may have different preferences for general contents over specific contents, or vice-versa. Conventional search engines are not capable of determining whether a document's content is more general than the other in certain aspects, thus not capable of providing an option for the user to indicate his/her preference and customize the search parameters for this purpose.

The control 331 in the user interface 150 (FIG. 3) allows a user to indicate whether he/she wants general contents or specific contents to be ranked higher in the returned search result.

Figure 5:
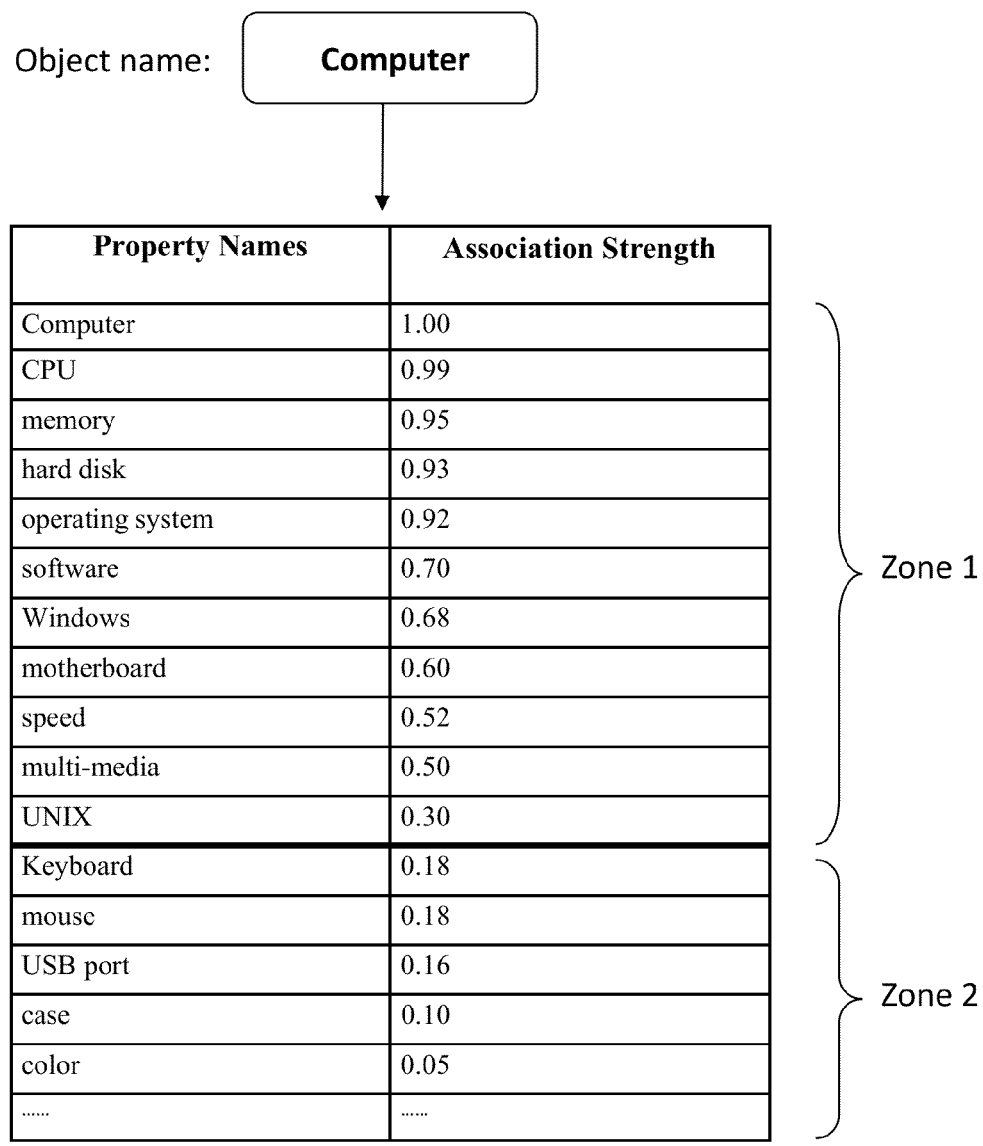
FIG. 5 illustrates the definition of zones using the exemplified data table of FIG. 2 in relation to the general vs. specific type of document content.

FIG. 5 illustrates an exemplified dataset for the process. The property terms or names and their associated association strength values related to an object name such as "computer" are separated into zones. In an exemplar embodiment, the property terms in the table are divided into two zones, such as "zone 1" and zone 2". The criteria for zone division can vary. In one example, a first zone includes property terms that have association strength values higher than 0.2. A second zone includes those property terms that have association strength values below 0.2. The logic behind this method is that based on research conducted by the present inventor, higher valued properties are more likely associated with the general aspects of the object, while lower valued properties, especially when they are the only ones mentioned, are more likely associated with specific aspects of the object. For example, a general discussion about computer may often mention the property names "CPU", "memory", and "operating system" etc., which are of high association strength values as shown in FIG. 5.

For a given document that contains property terms associated with the queried object, the total number of terms in the document that match the terms in the first zone of the knowledge data table is counted and the value of the counting is stored in a variable called zone_1_count. Then, the total number of terms that match the terms in the second zone of the knowledge data table is counted and stored in a variable called zone_2_count. A third variable zone_ratio is defined as follows:

$$\text{zone\_ratio} = \text{zone\_1\_count}/(\text{zone\_1\_count} + \text{zone\_2\_count}) \quad \text{Eqn. (1)}$$

For a document that contains at least one property term, the value of zone_ratio can range between 0 and 1. If the zone_ratio value is closer to 1, it is interpreted that the document's content is more likely about the general aspects of the object name. If the value is closer to 0, it is interpreted that the document's content is more likely about the specific aspects of the object, or not so much about the object.

It should be noted that zone_ratio can be calculated with other methods. For example, the frequency count of each property name can be multiplied by its association-strength value to produce a weighted frequency count for that property name. The weighted frequency counts can be summed up for the property names in zone 1 to produce zone_1_count, and for zone 2 to produce zone_2_count. Eqn. (1) can still be used to compute zone_ratio. Furthermore, the data table can be divided into more than two zones; and ratios between different zones and/or between combinations of multiple zones can also be used to indicate the content characteristics, whether in terms of general information vs. specific information, or other characteristics of the content.

It should also be noted that the term "count" or "counting" can include a single occurrence, at least one occurrence, or multiple occurrences of a property name. For example, zone_1_count can simply capture the number of distinct property names that exist in the document instead of counting the total occurrences, or multiple occurrences for each of the property names.

In some embodiments, a variable named w1 is defined to contain the value of a customized ranking parameter related to the degree of generality or specificity of the document topics. When the user selects a slider position in the control 331 in the user interface 150 (FIG. 3), a value is assigned to w1. A high slider position means that the user wants to find documents that more likely include the general content related to the object. Likewise, a low position in 331 indicates that the user wants to find documents that more likely include the specific content related to the object. For example, values of 1, 0.5 and 0 are respectively assigned to the variable of w1 corresponding to the high, mid, and low positions.

A relevance score is represented by a variable called general_content_rank_score. The value of general_content_rank_score is then calculated as a function of the value of w1 and the zone_ratio score of the document.

The following is an example of a discrete function that determines the value of the general_content_rank_score as a function of the user-determined variable w1, and the zone_ratio score of the document. The example is represented in a pseudo-code format, known for persons skilled in the art of basic computer programming.

If w1=1 then general_content_rank_score=zone_ratio (no change)
If w1=0.5 then
If zone_ratio>=0.667 then $$\text{general\_content\_rank\_score} = \text{zone\_ratio} - 0.667$$

If zone-ratio<0.667 and zone_ratio>=0.334 then $$\text{general\_content\_rank\_score} = \text{zone\_ratio} + 0.334$$

If zone-ratio<0.334 and zone_ratio>=0 then $$\text{general\_content\_rank\_score} = \text{zone\_ratio} + 0.334$$

end if
end if
If w1=0 then
If zone-ratio>=0.667 then $$\text{general\_content\_rank\_score} = \text{zone\_ratio} - 0.667$$

If zone-ratio<0.667 and zone_ratio>=0.334 then $$\text{general\_content\_rank\_score} = \text{zone\_ratio} - 0.334$$

If zone-ratio<0.334 and zone_ratio>=0 then $$\text{general\_content\_rank\_score} = \text{zone\_ratio} + 0.667 \qquad \text{Eqn. (2)}$$

end if
end if

The principle behind the function is to assign a high ranking score to a document that has a low zone_ratio score if the user indicates that a specific content is preferred to be ranked higher than a general content, and vice-versa.

When the control 331 is the only option enabled in the user interface, documents can be ranked or re-ranked according to the values of the general_content_rank_score for each document in descending order.

User Customized Search: Detailed Vs. Brief Contents in Documents

As described above in relation to the control 332 (FIG. 3) and the module 142 (FIG. 4), another characteristics of a document content is about the depth of the information the document contains about the queried topic. There are times when a user only wants to look for some brief information about an object. Sometimes a user wants to gather detailed information about the object. While documents can be of different lengths, a long document may not necessarily contain more relevant content than a shorter document. It is the relevant information in the content that matters. Conventional methods may not be able to determine whether a long document contains more relevant content than a short one.

In the present disclosure, a variable called term_depth_score is computed for each property term and for the document. In some embodiments, this score can be the frequency of the property term in that document. A variable total_depth_score is calculated by summing up the individual term_depth_score for different property names in the document. A pre-determined upper bound value of total_depth_upper_bound is used to limit the values of total_depth_score of individual documents to a finite range. The total_depth_score is capped at the total_depth_upper_bound. For the value of the total_depth_score exceeding the total_depth_upper_bound, the value of the total_depth_score is assigned to be the same as the total_depth_upper_bound. In an example, the total_depth_upper_bound is pre-selected to be 500. The total_depth_score is calculated by counting the frequency of the terms in the document that match the property names in the date table (FIG. 2). The property names used in the date table can be pre-selected, for example, by setting a threshold for the association strengths. The threshold value for the association strengths of the property names in the data set can for example be 0.01, 0.05, or 0.1. The total terms in the document that match the property names in the table with their association strength values higher than 0.1 are counted up to 500 in this example. If the count reaches 500, it is assumed that the document contains quite detailed description about the queried object.

A variable depth_ratio is defined in the following formula:

$$\text{depth\_ratio} = \text{total\_depth\_score}/\text{total\_depth\_upper\_bound} \qquad (3)$$

The range of depth_ratio will be between 0 and 1 because the total_depth_score is capped by total_depth_upper_bound as described above. If the value is closer to 1 then it is interpreted that the document is likely to contain an in-depth or comprehensive coverage about the queried object, and if the value is closer to 0 then it is interpreted that the document is likely to contain only a brief or even no coverage about the queried object.

In connection to the first characteristic relating to the general or specific nature of a document's content, a document comprising detailed discussions about the object tends to mention many relevant property names, but the information can be either general or specific about the object, depending on which zone the mentioned property names are located in as shown in FIG. 5 and discussed above. Likewise, a document comprising brief discussions about the queried object tends to mention fewer relevant property names, but the information can be either general or specific about the object, depending on which zone the mentioned property names are located in as shown in FIG. 5.

In the same way as with the general vs. specific search parameter above, a variable of w2 can be defined, and values of 1, 0.5 and 0 can be respectively assigned to the variable of w2 corresponding to the high, mid, and low positions of the user interface control 332.

A relevance score is represented by a variable called content_depth_rank_score. The value of content_depth_rank_score is then calculated for each document as a function of the value of w2 and the depth_ratio score of the document.

A function the same as or different from eqn. (2) can be used to calculate the values of content_depth_rank_score for each document.

When the control 332 is the only option enabled in the user interface, documents can be ranked or re-ranked according to the values of the content_depth_rank_score for each document in descending order.

User Customized Search: Query-Specific Topics Vs. Conceptually Related Topics in Document Content As described above in relation to the control 333 (FIG. 3) and the module 143 (FIG. 4), another characteristics of a document content describes whether a document's content is specifically about an queried object or may be about other objects that are conceptually related to the queried object. For example, if the queried object is "desktop computer", certain properties of a desktop computer can also be properties of "notebook computer", such as the hardware components and operating systems, etc. Thus, document about "notebook computer" may also contain information that is relevant and useful to a query on "desktop computer".

There are times when a user only wants to search for information specifically about the queried object, but there may also be times when the user may want to also look at documents that are conceptually related to the queried object, such as the case of how "notebook computer" is related to "desktop computer". Conventional methods may not be able to determine whether a document that does not contain the object name contains relevant content about related objects or not. For example, conventional methods may not be able to determine whether a document in which the term "desktop computer" does not occur may also contain relevant information about "desktop computer", such as in a document about "notebook computer".

The present disclosure provides tools for customized searches to allow a user to adjust the degree of "query-term search" vs. "concept search" in his or her search. A search with emphasis on the exact match of the object name or keyword in a query can retrieve documents in which the object name plays a determining role. A concept-based search may also retrieve documents that contain information that is conceptually related to the object name even the object name itself is not the focus of the content. The present disclosure provides a method for the user to indicate his or her preference for query-specific search or concept search; and to flexibly adjust the ranking of search results using the control 333 (FIG. 3).

In the presently disclosed methods, a variable called keyword_prominence_score stands for the prominence score of the keyword in the document. A variable called property_terms_prominence_score stands for the prominence score of the property terms in the document. In an example, the prominence score of the keyword and the property terms can be computed by their respective frequencies of such terms in the document. (It should be noted that other quantitative measures of the two prominences can be used without deviating from this principle of the present invention). A parameter called keyword_properties_ratio is defined in the following formula:

$$\text{keyword\_properties\_ratio} = \text{keyword\_prominence\_score} / (\text{keyword\_prominence\_score} + \text{property\_terms\_prominence\_score}) \quad \text{Eqn. (4)}$$

In the present disclosure, as shown in FIGS. 2 and 5, the queried object name or the keyword itself can be viewed as a property term. For the document that contains at least one keyword or one property term, the range of the keyword_properties_ratio is between 0 and 1. A value of keyword_properties_ratio closer to 1 can be interpreted as that the document is specifically about the queried object. A value of keyword_properties_ratio closer to 0 can be interpreted as that the document may be about other objects that are conceptually related to the queried object.

It should be noted that other methods of measuring the content's specificity of the query-term can also be used instead of the ratio between the keyword count and the property terms count. The keyword count can be replaced by a keyword prominence score that may be calculated based on the different positions of the keyword in sentences, paragraphs and/or the document. And the property terms count can be treated in the same way, as well as using different weights based on the association strength of each property term.

In the same way as with the general vs. specific search parameter above, a variable of w3 can be defined, and values of 1, 0.5 and 0 can be respectively assigned to the variable of w3 corresponding to the high, mid, and low positions of the user interface control 333.

A relevance score is represented by a variable called keyword_focus_rank_score. The value of keyword_focus_rank_score is then calculated for each document as a function of the value of w3 and the keyword_properties_ratio score of the document.

A function the same as or different from eqn. (2) can be used to calculate the values of keyword_focus_rank_score for each document.

When the control 333 is the only option enabled in the user interface, documents can be ranked or re-ranked according to the values of the keyword_focus_rank_score for each document in descending order.

It should be noted that in addition to the above three exemplar parameters and the corresponding user interface objects, other customized search adjustment parameters and corresponding user interface objects can be used based on the principle of analyzing the distribution patterns of the property terms in the document without deviating from the spirit of the present invention.

Figure 6:
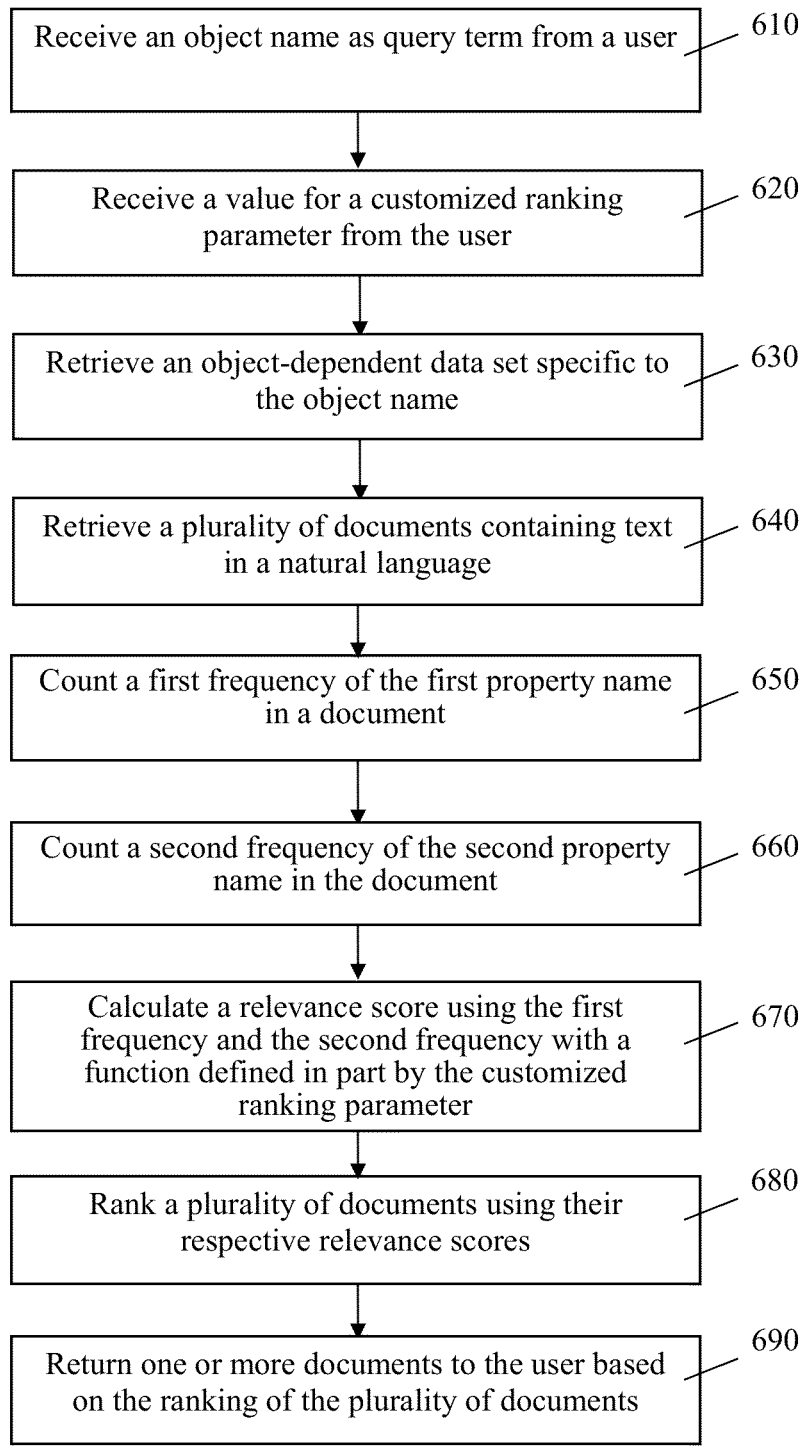
FIG. 6 is a flowchart for the customized search in accordance with the present invention.

FIG. 6 shows a flowchart for the customized search in accordance with the present invention. An object name is received as a query term from a user at the user interface (e.g. 150 FIGS. 1, 3, and 4) (step 610). The user can set values for a customized ranking parameter using controls 331-333 at the user interface (e.g. 150, FIG. 3) (step 620). These values are sent to a computer processing system (e.g. 120, FIGS. 1, 4). The computer processing system retrieves an object-specific data set related to the object name from a computer storage system (FIGS. 1, 4) (step 630). The object-specific data set includes a plurality of property names and association-strength values. Each property name is associated with an association-strength value. The property names include a first property name and a second property name. A plurality of documents containing text in a natural language are stored in a storage system and retrieved by the computer processing system (FIGS. 1, 4) (step 640).

The computer processing system counts a first frequency of the first property name in one of the documents (step 650). The computer processing system can also count a second frequency of the second property name in the document (step 660). For example, in the above describe section "User customized search: general vs. specific topics in document content", the computations of zone_1_count and zone_2_count can involve the counting frequencies of property names in zone 1 and zone 2 respectively (FIG. 5). Similarly, the calculation of total_depth_score, as described above, also involves the counting of property names listed in the data table in a document. For user customized search related to query-specific topics vs. conceptually related topics in document content, the computations of keyword_prominence_score and property_terms_prominence_score also involve counting of frequencies of the object name and other property names in the document.

The computer processing system then calculates a relevance score as a function of the first frequency and the second frequency (step 670). As shown in Eqns. (1-3) above, variables such as zone_ratio, depth_ratio, and keyword_properties_ratio are first calculated using the first frequency and the second frequency (among possibly frequencies of other property names). Then the relevance score such as general_content_rank_score is calculated, as shown by eqn. (2) above, a function that is in part defined by the customized ranking parameter (w1).

The plurality of documents in the document collection are then ranked using their respective relevance scores (step 680). The one or more documents in the ranked documents can be returned to the user based on the ranking of the plurality of documents (FIGS. 1, 3, 4) (step 690).

User Customized Search: Combining Multiple Parameters

Referring back to FIG. 3, the controls of 331-333 can for example each include three pre-set positions: high, mid, and low for each slider. In combination, the three positions in each of the controls 331-333 can provide a user up to 27 different options for customized searches.

As has been described above in detail, in an exemplar embodiment, values of variables w1, w2, and w3 can represent the user preference for general content, content depth, and keyword focus. Depending on the user-determined values of such variables, documents with different content characteristics parameter values are assigned different ranking scores. For example, if the user prefers the concept-based content over keyword-based content, a document with a low-valued keyword_properties_ratio will be assigned a high ranking score. The same is also the case with other content characteristics parameters.

When only one of the three parameters is enabled in the user interface, documents can be ranked or re-ranked according the values of one of the ranking scores that is enabled in the user interface.

When two or more customized ranking parameters are enabled in the user interface, a variable named adjusted_document_rank_score is defined, and a function such as exemplified by Equation (5) below, can combine the values of the rank scores of each parameter, and produce an adjusted_document_rank_score for each document, and all documents can be ranked and re-ranked according to their adjusted_document_rank_score.

An exemplified function for calculating the adjusted document rank score can be the following:

$$\text{adjusted\_document\_rank\_score} = \text{general\_content\_rank\_score} + \text{content\_depth\_rank\_score} + \text{keyword\_focus\_rank\_score} \quad \text{Eqn. (5)}$$

If each of the variables of general_content_rank_score, content_depth_rank_score, keyword_focus_rank_score has a range between 0 and 1, the adjusted_document_rank_score can have a range between 0 and 3. A normalization factor can be added to normalize the adjusted_document_rank_score to a range between 0 and 1.

The value of adjusted_document_rank_score represents an overall relevance score for the document taking into account the values of all three customized ranking parameters determined by the user, which can be used to rank documents in a collection. The higher ranked documents can be returned to the user first and displayed in the area (350, FIG. 3) as the search results in response to the three customized ranking parameters set from the controls 331-333.

It should be understood that the above-described methods are not limited to the specific examples used. Configurations and processes can vary without deviating from the spirit of the invention. For example, additional parameters other than the ones described above can be used to reflect other characteristics of the document content. For example, the total number of well-formed sentences in the document, together with the total number of incomplete sentences in the document can also be obtained to indicate whether the content of a document is descriptive in nature or may just be a list in style such as a directory or table of content page. Other user interface methods can be used instead of the examples provided above. The values that are received from the user interface controls can be continuous or discrete, in different value ranges, and with other than three levels. Other characteristics of the document content can be analyzed by utilizing the object-specific data set. Other adjustment functions can also be used, and other functions for calculating the adjusted document score can also be used, all without deviating from the spirit of the present invention.

The above cited U.S. patent application Ser. No. 12/573,134 titled "System and Methods for Quantitative Assessment of Information in Natural Language Contents" disclose system and methods for determining the relevance of a document in relation to a query. A term in a query is treated as an object name, and an object-specific dataset containing a plurality of terms each functioning as a property name of the object is used for the calculation of a quantitative measure of information contained in the document about the object. This quantitative measure of the information about the object name is then used as the measure of relevance between the document and the query. An important aspect of the above referenced disclosure is that even if a document does not contain the keyword in the query, the document can still be returned to the user as long as the document content is conceptually relevant to the query.

In the above referenced disclosure, the focus was on determining the relevance between a query and a document, or between a document class and a document instance. In the present invention, the focus is on determining the relevance between two or more documents, or between two or more text contents in any other format, such as emails, descriptions, news, user comments on a social network, or opinions on a product/service or on a social-economical-political issue, blogs/forum, SMS, IM, advertisements, job descriptions, resumes, and other contents on mobile or handheld computing devices, etc. In some embodiments, the focus is on determining the relevance between a text content and a concept definition represented by the object-specific dataset as described above and in the above referenced disclosure.

In the present invention, the object-specific dataset in the above referenced disclosure is interchangeably referred to as a conceptual association dataset for ease of description of the new applications of the methods that will be described below.

Referring to FIG. 2, an example of a conceptual association dataset for the concept of "Computer" is illustrated. The column containing the numeric values that represent association strength between the property terms and the concept can be optional. In other words, the association strengths for different property terms can be a constant (e.g. having a value of 1 for all property names). When this is the case, having a constant association strength value can be considered as being equivalent to having no association strength value, which is equivalent to only having property terms in the dataset without the association strength column as shown in FIG. 2). The dataset can still be used to determine the relevance between two or more documents.

Figure 7:
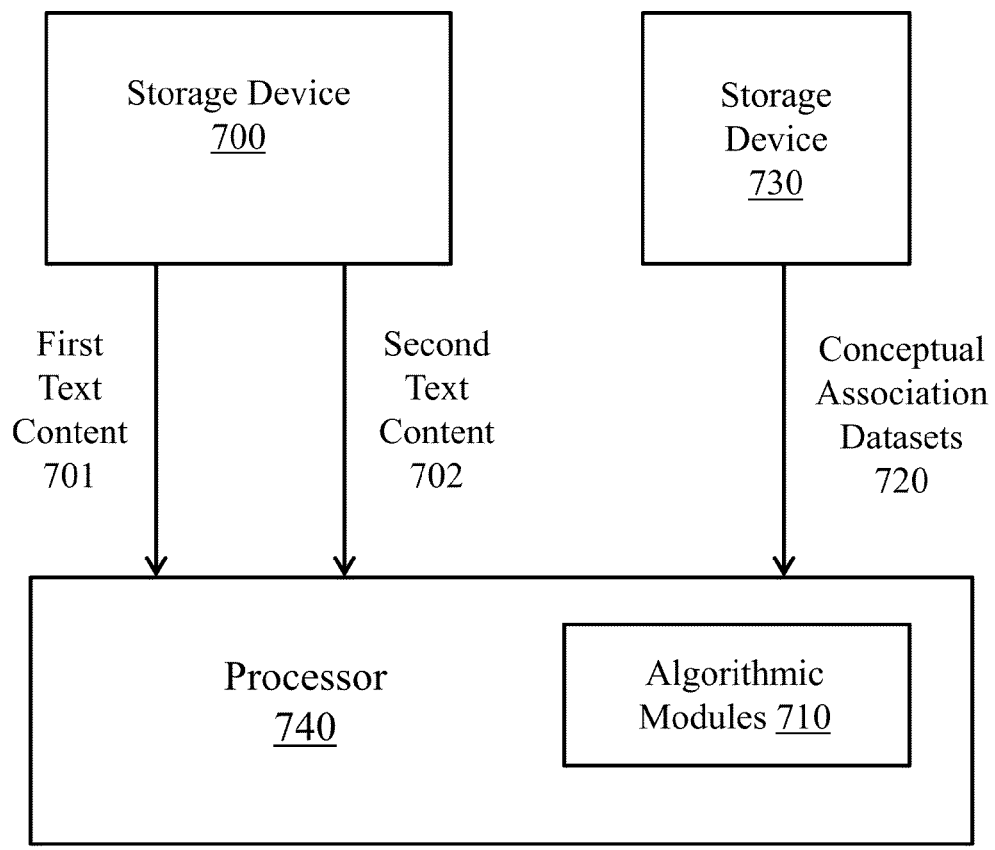
FIG. 7 is a system block diagram illustrating the components of the system that can be used to determine the relevance between one or more documents with a conceptual association dataset in accordance with the present invention.

In some embodiments, the components of a system that can be used to determine the relevance between two or more documents in accordance with the present invention, are illustrated in FIG. 7. A first text content 701 and a second text content 702 is stored in storage device 700, and are input into processor 740 respectively. The processor includes algorithmic modules 710 that analyze the content of the two text contents respectively. The processor further retrieves a conceptual association dataset 720 from a plurality of datasets from a storage device 730, each of such datasets being associated with a different concept, and calculates a first relevance score R1 between the first text content and the conceptual association dataset, and a second relevance score R2 between the second text content and the conceptual association dataset. If the relevance scores R1 and R2 are above a pre-defined threshold, it then calculates a relevance score R12 as the numeric measure of the relevance between the first text content and the second text content. If R12 is above another pre-defined threshold, the processor outputs a signal indicating that the two text contents are relevant, otherwise, the processor outputs a signal indicating that the two text contents are not relevant. The system can take further actions with the relevance signal, such as to display a relevant document or email, etc., to the user, or display a relevant advertisement somewhere in the user interface.

Figure 8A:
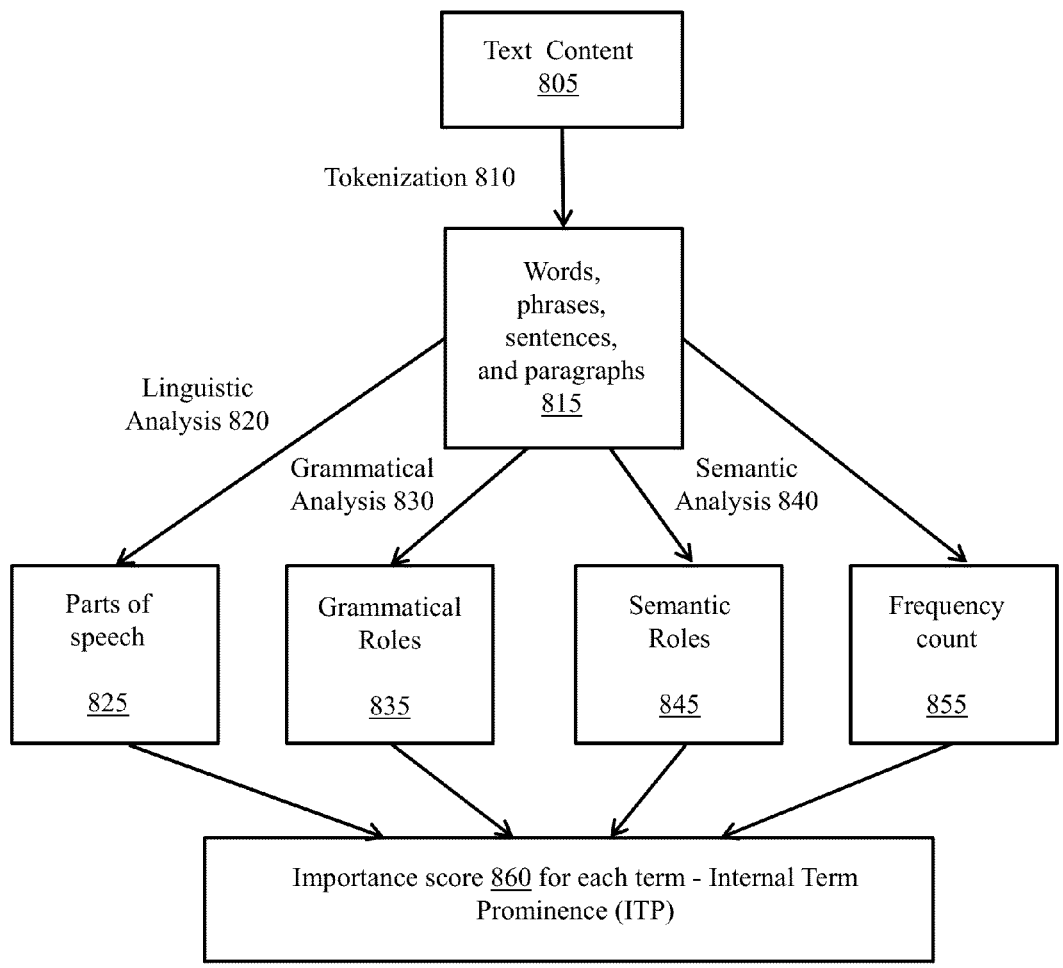
FIGS. 8A and 8B are flow diagrams illustrating the steps of analyzing the text content.

In some embodiments, the system may check the relevance not by retrieving a single dataset at a time, but retrieving multiple datasets in a certain way or in a combined format, and concurrently checking multiple datasets to find a most relevant dataset that shows the highest relevance value between the text contents being compared. The system first analyzes the text contents as they are input. FIG. 8A is a flow diagram illustrating the steps of analyzing the text content. In FIG. 8A, a text content 805 is first tokenized (810) into words, phrases, sentences, and paragraphs, whenever applicable. For each token comprising a word or a phrase 815, as an optional step, an importance score can be calculated based on a number of factors. Linguistic analysis 820 can be applied to identify the parts of speech of each word or phrase 825, such as a noun or a noun phrase, a verb or a verb phrase, or a preposition or a prepositional phrase, a pronoun, etc. Then, optionally, grammatical roles 835 are identified (830) for such nouns or verbs and their phrases such as whether a noun is a subject of a sentence, or a direct or indirect object of a verb, or a head or a modifier of a phrase, etc. A sentence can also be identified as an independent clause, or a dependent clause of various types such as a relative clause or an adverbial clause, etc. Optionally, semantic analysis 840 can also be performed to identify the semantic roles or semantic attributes or attribute values 845 of these words or phrases such as whether a noun is referring to an actor or agent of an action, or a recipient of an action, or an instrument, or whether an adjective is referring to a state, or an attribute of something, or whether a term is the name of a product or service, or indicates a positive or negative opinion, etc. Furthermore, the frequency count 855 of each term occurring in the text content is also obtained as an importance factor. Then, an importance score 860 of a term is calculated based on one or more of the operations in steps 810-855. The importance score 860 is also referred as Internal Term Prominence (ITP) in the present application and above cited patent applications by the same inventor.

In the present invention, the term "parts of speech" refers to the classes or categories of word or phrases as they are used in a sentence. In traditional grammar, each word in a sentence can be labeled with a class name such as a "noun", "verb", "adjective" "adverb", "preposition", "article" "conjunction" and other classes.

In one embodiment, the method for the calculation of the importance score is to simply count the frequency of each term occurring in the text content.

In another embodiment, the method is to first assign different weighting coefficient values to the terms according to their parts of speech. For example, a noun or noun phrase may be assigned a weighting coefficient of 0.9, while a verb or verb phrase can be assigned a weighting coefficient of 0.7, or a preposition can be assigned a weighting coefficient of 0.2, or a pronoun or an article can be assigned a weighting coefficient of 0.1 (to indicate their relatively lower importance), and such values can be used as the importance score of the term.

In yet another embodiment, the method is to first assign different weighting coefficient values to the terms according to their grammatical roles. For example, a term that is the subject of a sentence may be assigned a weighting coefficient of 0.9, while a term that is the predicate of the sentence can be assigned a weighting coefficient of 0.8; a term that is the head of a subject phrase (such as the word "camera" being the head of the phrase "digital camera") can be assigned a weighting coefficient of 0.6; a term that is a modifier of a subject phrase (such as the word "digital" being a modifier in the phrase "digital camera") can be assigned a weighting coefficient of 0.5; a term that is a head of a predicate phrase can be assigned a weighting coefficient of 0.4; and a term that is a modifier of a predicate phrase can be assigned a weighting coefficient of 0.3, etc., as its importance score.

In yet another embodiment, the method is to first assign different weighting coefficient values to the terms according to their semantic roles. For example, a term that is the "actor" of an action (such as the word "John" in "John broke the window") may be assigned a weighting coefficient of 0.9, while a term that is the "recipient" of an action (such as the word "window" in "John broke the window") can be assigned a weighting coefficient of 0.8; a term that is an "instrument" (such as the word "stone" in "John broke the window with a stone") can be assigned a weighting coefficient of 0.6; and a term that indicates a state or an attribute (such as the word "running" in "John is running") can be assigned a weighting coefficient of 0.4, etc., as its importance score.

In yet another embodiment, the method is to first assign different weighting coefficient values to the terms according to their semantic attributes or attribute values. For example, a term that is the name of a product or service may be assigned a weighting coefficient of 0.9, while a term that indicates an interest such as "like", "interested in", etc., can be assigned a weighting coefficient of 0.8; a term that indicates a positive opinion such as "good", or "fantastic", etc., can be assigned a weighting coefficient of 0.6; and a term that indicates a negative opinion can be assigned a weighting coefficient of 0.5, etc., as its importance score.

In yet another embodiment, the method is to combine two or more of the above weighting coefficient values to produce the importance score of the term.

In yet another embodiment, the method is to use one or combine two or more of the above weighting coefficients, and then to multiply the frequency of the term by the weighting coefficient value to produce the importance score of the term.

Figure 8B:
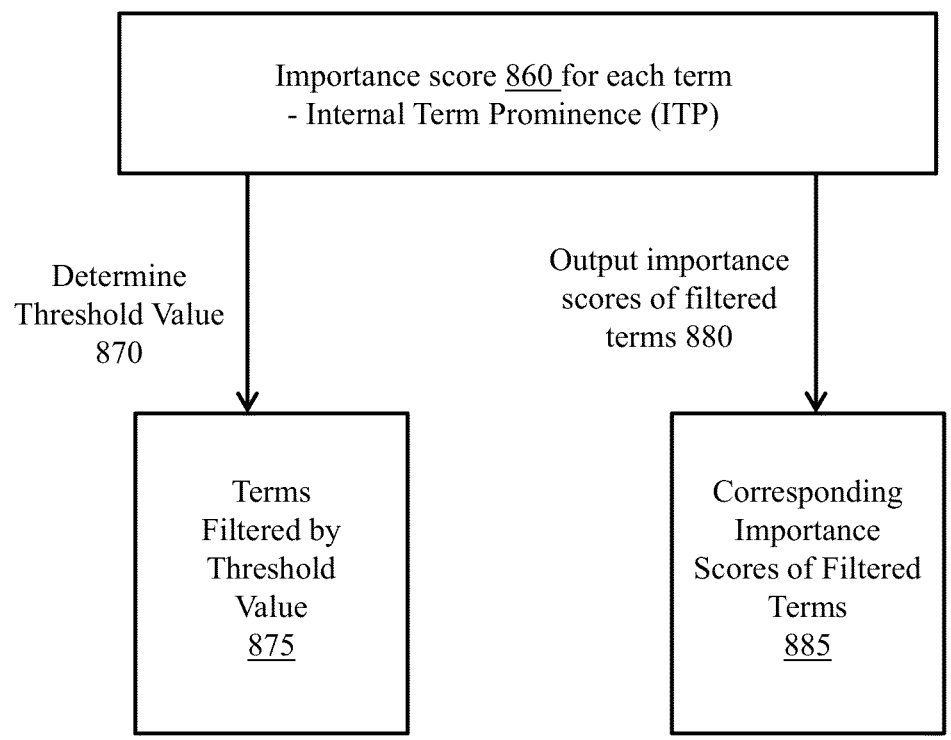

Once the importance score 860 is determined, those terms having importance scores above a threshold are selected and output to the next step (870) as illustrated in FIG. 8B. Optionally, the corresponding importance scores can also be output (880).

In some embodiments, the terms 875 selected (i.e. filtered by the threshold value) and output from the text content using the above described methods can be used as topic terms of the text content, or as a representation of the text content (870). Optionally, the corresponding importance scores 885 can also be output as part of the representation of the text content (880).

In some other embodiments, the importance score of a term can be further determined in combination with a corresponding score of the same term from one or more other text contents herein referred to as "external contents", and the corresponding score of the same term is herein referred to as "External Term Prominence" score, or ETP, in short. In some embodiments, the external contents used for obtaining ETP score can be a collection of random text contents.

Figure 9:
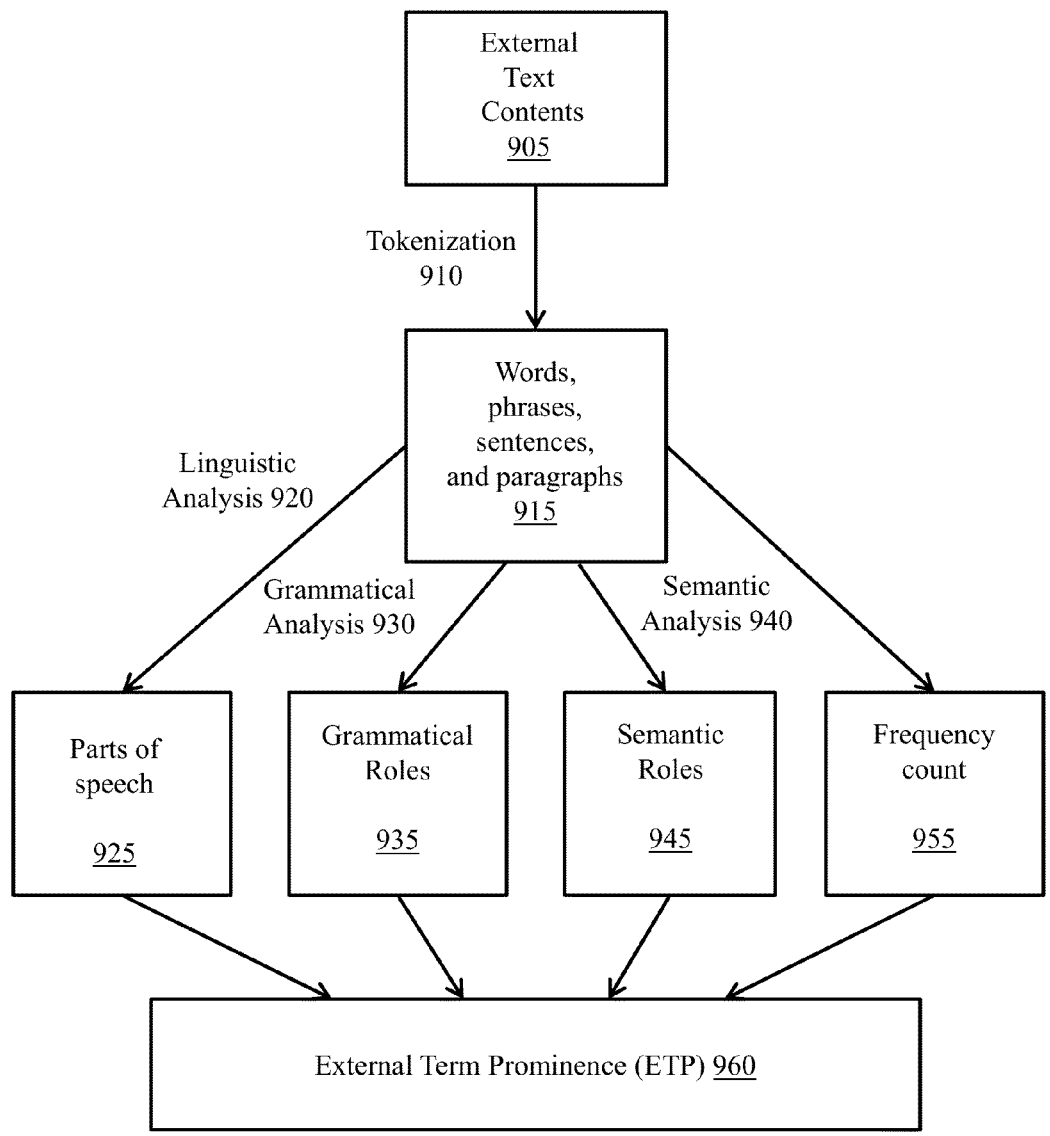
FIG. 9 is a flow diagram illustrating the process of obtaining ETP values for terms from a plurality of external contents

FIG. 9 is a flow diagram illustrating the process of obtaining ETP values for terms from a plurality of external contents using the similar steps as described in conjunction with FIG. 8A for each such external content, and then averaged by the total number of external contents used. When applicable, an external text content 905 is first tokenized (910) into words, phrases, sentences, and paragraphs. For each token comprising a word or a phrase 915, as an optional step, an importance score can be calculated based on a number of factors. Similar to the steps illustrated above in FIGS. 8A and 8B, linguistic analysis 920 can be applied to identify the parts of speech of each word or phrase 925, such as a noun or a noun phrase, a verb or a verb phrase, or a preposition or a preposition phrase, a pronoun, etc. Then, optionally, grammatical roles 935 are identified (930) for such nouns or verbs and their phrases such as whether a noun is a subject of a sentence, or a direct or indirect object of a verb, or a head or a modifier of a phrase, etc. A sentence can also be identified as an independent clause, or a dependent clause of various types such as a relative clause or an adverbial clause, etc. Optionally, semantic analysis 940 can also be performed to identify the semantic roles or attributes 945 of these words or phrases such as whether a noun is referring to an actor or agent of an action, or a recipient of an action, or an instrument, or whether an adjective is referring to a state, or an attribute of something, or whether a term is the name of a product or service, or indicates a positive or negative opinion. Furthermore, the frequency count 955 of each term occurring in the text content is also obtained as an importance factor. Then, an external term prominence (ETP) 960 of a term is calculated based on one or more of the operations 910-955.

FIG. 10 shows an exemplified ETP dataset with hypothetical terms "computer", "CPU", "Memory", "hard disk", and "software", and their corresponding ETP score values for "parts of speech", "grammatical roles", "semantic roles", and "frequency count".

To distinguish from the external score, the original term importance score obtained from the first text content using the steps as described in FIGS. 8A and 8B is herein and hereafter named "Internal Term Prominence" score or ITP in short.

When ETP score is used for determining the term importance score in a text content, in some embodiments, the final score is determined by the following formula, wherein $S\_j$ denotes the final term score of the j-th term in a plurality of terms in the first text content.

$$S\_j = ITP - ETP \quad\quad\quad \text{Eqn. (6)}$$

In some other embodiments, the final score of $S\_j$ for the j-th term in the first text content is determined by the following formula.

$$S\_j = ITP*ITP*/(ITP+ETP) \quad\quad\quad \text{Eqn. (7)}$$

Optionally, a normalization method can be applied to make the final score within a specified range when desired.

Once the importance score is determined in combination of ETP by using equation 1 or equation 2, a threshold can be defined such that only those terms the importance scores of which are above the threshold can be selected and output to the next step like in 870. And optionally, the corresponding importance scores can also be output like in 880.

Same as with ITP as described above, in some embodiments, the terms selected and output from the text content using the above described methods can be used as topic terms of the text content for various purposes, or as a representation of the text content like in 870. Optionally, the corresponding importance scores can also be output as part of the representation of the text content like in 880.

The above steps are repeated for the second text content, and a list of terms with their importance scores can be output to the next step for relevance calculation.

As is described above, calculation of importance scores for tokens in the text contents is optional, but can provide the benefit of more accurately determining the relevance. For illustration purpose, the following examples are based on embodiments that calculate the importance scores for tokens in the text contents using one or more of the factors as illustrated above. It should be noted that such importance scores are optional for the purpose of using the methods of the present disclosure to determine the relevance between two or more text contents.

With the importance scores calculated and representative or topic terms selected from both the first and second text contents, the next step is to calculate the relevance scores.

In contrast to some conventional methods of comparing the similarity between two text contents, in which the terms from first text content are matched with the terms from the second text content, and the similarity score for the two text contents is based on the number of terms that occur in both the first and second text content, or plus their frequency count in each text content. In the present invention, one way to determine the similarity of two text contents is to match the terms in the two contents together with the their importance scores as calculated using the above-described methods. For example, a high-scored term in one text content matching a high-scored term in another text content can indicate a higher similarity than a high-scored term in one content matching a low-scored term in another content. Terms from the text contents can be represented in the form of term vectors together with their corresponding importance score vectors, and the similarity of two text contents can be measured by using a method known as dot product of the term/score vectors.

Another way of determining the similarity or relevance between two or more text contents is not directly match the terms from the first text content with the terms from the second text content. In the present invention, the terms from the first and second text contents are respectively matched against one or more conceptual association datasets retrieved from the dataset storage (730 in FIG. 7).

Figure 11:
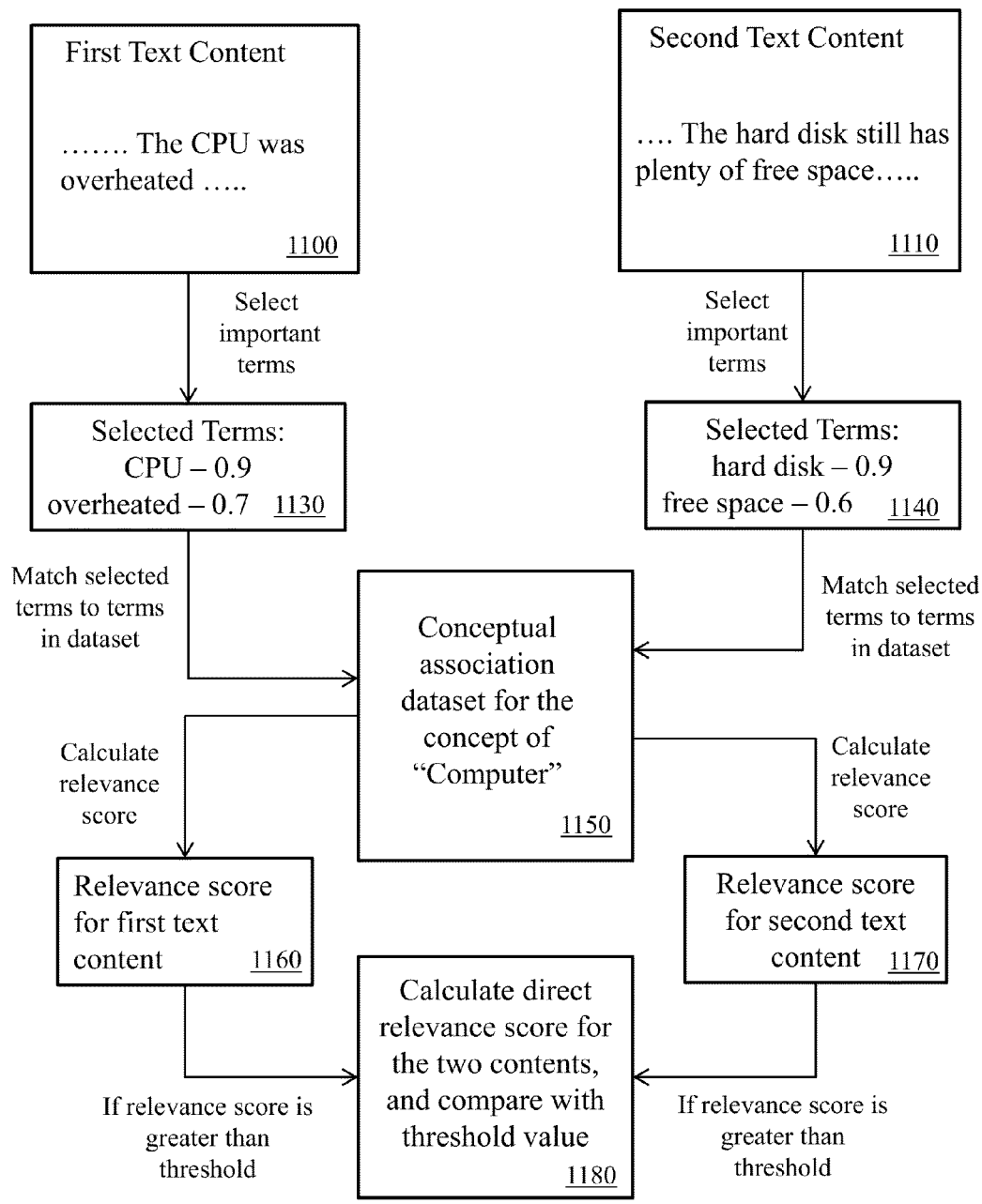
FIG. 11 is an exemplified flowchart for determining the relevance between a first and a second text content with a conceptual association dataset in accordance with the present invention.

As described above, the conceptual association datasets are concept specific. Each different concept has its own association dataset. FIG. 11 illustrates exemplified steps for determining relevance between a first text content 1100 and a concept or a conceptual association dataset 1150, and the relevance between a first text content 1100 and a second text content 1110 using a conceptual association dataset. Using the concept "Computer" as an example, property terms and their association strengths relative to "computer" are shown in FIG. 2. As described earlier, use of the varying association strengths are optional, but can enhance the accuracy. In some cases, association strengths are constant.

For a first text content contains text:
(1) "The CPU was overheated",
and a second text content:
(2) "The hard disk still has plenty of free space",
important terms selected from the first text 1130 include "CPU" (with a hypothetical importance score of 0.9), and "overheated" (with a hypothetical importance score of 0.7). Important terms selected from the second text 1140 are "hard disk" (with a hypothetical importance score of 0.9), and "free space" (with a hypothetical importance score of 0.6).

Conventional methods of keyword matching apparently will not consider that the first text content 1100 and the second text content 1110 relevant because there are no matching keywords between sentences (1) and (2).

In the present invention, the terms from the first text content is matched with a conceptual association dataset 1150. An example of the conceptual association dataset 1150 is shown in FIG. 2. In this example, there is a match for the word "CPU", but no match for the word "overheated".

In some embodiments, the relevance score 1160 between the first text content and the conceptual association dataset in this example can be determined to be 1 for one match, and can be incremented to 2 if the word "overheated" also had a match.

In some embodiments, the frequency of the matching term in the first text content can also be used to determine the relevance score 1160 between the first text content and the conceptual association dataset by adding the frequency of the matching terms to the total count. In this example the frequency of the matching term "CPU" in the first text content is 1, but can be more than 1 in text contents other than this example.

In some embodiments, the relevance score 1160 between the first text content and the conceptual association dataset in this example can be determined to be 0.9 based on the term's importance score in the first text content 1100, and can be incremented to 0.9+0.7=1.6 if the word "overheated" with its term importance score being 0.7 also had a match.

In another embodiment, the relevance score 1160 between the first text content and the conceptual association dataset in this example can be determined to be 0.99 based on the association strength value of the property term of "CPU" (as shown in FIG. 2) that matches the term from the first content 1100, and can be incremented by another association strength value of "overheated" if the word "overheated" also had a match.

In another embodiment, the relevance score 1160 between the first text content and the conceptual association dataset in this example can be determined to be 0.9*0.99=0.891 if the term importance score is multiplied by the association strength of the term "CPU" in the dataset, and can be incremented if there were 2 or more matched terms.

In another embodiment, the relevance score 1160 between the first text content and the conceptual association dataset in this example can be determined to be 0.9+0.99=1.89 as the sum of the term importance score and the association strength of the term "CPU" in the dataset, and can be incremented if there were 2 or more matched terms.

Users have the option to use one or more of these scores as a measure of relevance. For a hypothetical threshold value of 0.2, the first text content 1100 is considered to be relevant to the concept of "Computer" since all its scores are above this threshold.

In some embodiments, the concept association dataset is divided into zones as shown in FIG. 5. The criteria for dividing the dataset into zones can be based on a property term's association strength value being above a predefined threshold value and below another threshold value as described above for ranking documents according to their content characteristics, or based on other factors that are determined by the users for specific purposes. When such zones are defined, the relevance score of a text content can be determined by how many terms in the text content are matched with property terms in different zones. For example, for a first text content
(3) "The keyboard requires a USB adapter"
and a second text content
(4) "The mouse is not responsive",
both the terms "keyboard" and "mouse" have matching property terms in zone 2 in FIG. 5. The relevance score between the first text content and the conceptual association dataset can be 1 for one match only. The relevance score between the second text content and the conceptual association dataset can also be 1 for one match only. However, in this case with the matching property terms in zone 2, the user can apply a coefficient value such as 0.6 to the score to indicate that the match is in zone 2, and thus may have a lower relevance. Alternatively, the user can apply a coefficient value such as 1.2 to the score to indicate that the match is in zone 2, and thus may indicate that the contents are relevant in terms of specific properties of the concept of "computer", as described above about ranking for the document by "general" vs. "specific" characteristics.

When zones are used, the calculation can also utilize term importance score or association strength values as additional factors to determine the relevance score similar to the methods described above when zones are not used.

In some embodiments, when the matching terms are distributed in different zones of the conceptual association dataset, the relevance score can be a function of the count of matching terms in the different zones, or the scores calculated from the terms in the different zones as described above.

In some embodiments, the relevance score between a single text content (such as the first text content illustrated above) and the conceptual association dataset can be used to classify or categorize the text content into a document class or a category or a topic of interest defined by the conceptual association dataset. Users can pre-determine a threshold, and if the relevance score between the text content and the conceptual association dataset is above the threshold, the text content can be considered being a member of a category, or being about certain topics represented by the concept. For example, with their relevance score to the conceptual association dataset of "computer" being above the threshold, the contents in the example sentences of (1) and (2) can be both recognized as being about the topic of "computer", or can be associated with a document class of "computer".

The above described method can be very useful in many ways. It can be used in concept-based document classification or categorization as illustrated above, and can also be used in detecting user interest or intention. For example, if a user posts a comment on a social network or in an email or chat message such as "We will visit San Francisco next week, and will go to New York next month", this expression can be treated as a text content, and can be compared with one or more conceptual association datasets using the above-described methods. If the dataset for the concept or topic of "travel" is available, then it will likely contain such property terms as "visit", "San Francisco", "New York", "go to", etc., and the comment will likely be recognized as being relevant to the topic of "travel". Thus, it can be inferred that the user is interested in travelling or likes the activity of travelling. Even though the user may have not explicitly disclosed in his/her user profile about this interest, and even though the user's expression does not contain the word "travel", the user's interest and intention can still be detected, and can be used for accurate advertising or other purposes.

In addition to determining the relevance between a text content and a concept or concept association dataset, in some embodiments, the methods described above can be further applied to determine the relevance between two or more text contents, even though the individual text contents do not necessarily contain the same words or phrases, such as in (1) and (2). In such embodiments, after the relevance score of the first text content is calculated using the above described methods, the terms from the second text content 1110 are also matched with the conceptual association dataset 1150 in FIG. 2. Similar to the first text content as described above, different calculation methods can be used in different embodiments.

In this example there is a match for the word "hard disk", and no match for the word of "free space".

In some embodiments, the relevance score 1170 between the second text content 1110 and the conceptual association dataset 1150 in this example can also exemplarily be 1 for one match only, and can be incremented to 2 if the word "free space" also had a match.

In some embodiments, the frequency of the matching term in the second text content can also be used to determine the relevance score 1170 between the second text content and the conceptual association dataset by adding the frequency of the matching terms to the total count. In this example the frequency of the matching term "hard disk" in the second text content is 1, but can be more than 1 in text contents other than this example.

In some embodiments, the relevance score 1170 between the second text content and the conceptual association dataset in this example can be determined to be 0.9 based on the term's importance score in the second text content 1110, and can be incremented to 0.9+0.6=1.5 if the word "free space" with its term importance score being 0.6 also had a match.

In another embodiment, the relevance score 1170 between the second text content and the conceptual association dataset in this example can be determined to be 0.93 based on the association strength value of the property term of "hard disk" (as shown in FIG. 2) that matches the term from the second content 1110, and can be incremented by another association strength value of "free space" if the word "free space" also had a match.

In another embodiment, the relevance score 1170 between the second text content and the conceptual association dataset in this example can be determined to be 0.9*0.93=0.837 if the term importance score is multiplied by the association strength of the term "hard disk" in the conceptual association dataset 1150, and can be incremented if there were 2 or more matched terms.

In another embodiment, the relevance score 1170 between the second text content and the conceptual association dataset in this example can be determined to be 0.9+0.93=1.83 as the sum of the term importance score and the association strength of the term "hard disk" in the dataset, and can be incremented if there were 2 or more matched terms.

Like the case with the first text content described above, users have the option to use one or more of these scores as a measure of relevance. With a hypothetical threshold also being 0.2, then the second text content 1110 is also considered to be relevant to the concept of "Computer". In general, the thresholds for selecting terms in the first text content 1100 and the second text content 1110 can be different.

Then, the relevance score between the first text content 1100 and the second text content 1110 is calculated (1180) using the scores obtained above. One exemplar method for calculating this score is to calculate an average score of the score between the first text content 1100 and the concept of "Computer", and the score between the second text content 1110 and the concept of "Computer". For example, if the relevance score is 0.891 and 0.72 respectively for the first and second text content in relation to the concept of "computer", then averaging the two scores will produce a value of 0.8055. If this value is above another pre-defined threshold, for example, 0.3, then the two text contents can be considered highly relevant, and a signal can be output to indicate the relevance.

As is described above, conventional keyword-based matching method will fail to recognize the relevance between the two exemplar text contents, while the system and methods disclosed in the present invention can capture the hidden relevance, and produce a conclusion that is close to the one based on human judgments.

In some embodiments, in contrast to the example in FIG. 11 where only a single concept ("Computer") is being checked, multiple concepts can be checked to discover whether two or more pieces of text contents are relevant in relation to certain concepts. In implementation, multiple concepts can be checked one by one, or concurrently, or multiple datasets can first be combined in a certain way and then checked against text contents for more efficiency.

With the advantages of the present invention, one exemplar application of the above methods is in similar document search. A specific case of similar document search is in patent search. Whether it is for prior art search or for infringement search, what is of critical importance is not to miss a potentially similar issued patent or patent application. However, as briefly mentioned above, due to the varied uses of terms by different authors, both conventional keyword-based queries and keyword-matching-based document comparisons will fail to discover those patents that are conceptually similar but use different terms. The system and methods disclosed in the present invention can provide a powerful way to capture the potentially similar but seemingly dissimilar candidates, as illustrated in FIG. 11 with the example sentences (1) and (2) above.

Another example application of the present invention is in the job search and recruiting field. Typically, a job searcher knows what sort of position he or she is looking for, and wishes to find jobs based on job descriptions relevant to a resume. Without having to be limited by the results from a keyword based search, which can return either irrelevant results or miss truly relevant results, the job searcher can now use the present invention to automatically find relevant job descriptions. For example, if the job searcher has programming skills, and searches jobs using the query "software engineer", then the results may miss those job descriptions that do not use the term "software engineer", but instead use terms such as "programmer", "coder", etc. The present invention can relate the query for "software engineer" to the concept of computer programming, which will have associated terms that include "programmer", or "coder". Furthermore, the job searcher can also compare the relevancy of job descriptions to his or her resume, and the present invention can automatically return the most relevant results.

In some embodiments, the presently disclosed system and methods can also be used by a job recruiter who has access to a collection of resumes. In this case, the job recruiter can take a job description from an employer as the first text content, calculate a relevance score of this job description with one or more conceptual association datasets, and take one or more resumes in the collection as the second text content, and calculate a relevance score of each resume with the conceptual datasets, and then calculate the direct relevance score between a resume and the job description using the methods described above, and select the resumes that have a relevance score above a threshold value as a candidate for the job position.

Another example of the applications of the presently disclosed system and methods is concept-based search. In some conventional search, the search results are determined by the matching of keywords contained in the search query and in the documents to be retrieved. A query can contain one or more keywords or even sentences or paragraph. Using the present methods, the entire query can be treated as the first text content, and the documents in the search index can be treated as the second text content, and one or more conceptual datasets can be retrieved and a relevance score between the query and the conceptual dataset, and between the conceptual dataset and the documents can be calculated using the above methods; and a final relevance score between the query and the documents can be obtained; and the relevant documents can be retrieved and presented to the user. For example, if the user enters the query as "universities in the San Francisco Bay Area", some conceptually relevant documents in a conventional search index may not contain a keyword like "San Francisco Bay Area", thus may not be retrieved. But a conceptual dataset related to universities in the San Francisco Bay Area may contain such property names as "Stanford University", "UC Berkeley", "Santa Clara University", etc., and such relevant documents that are otherwise not retrievable by conventional search can be retrieved by the present system and methods.

Another area where the present system and methods can achieve effective and economical results is in Internet-based, or social network-based, or local computer-based, or mobile device-based advertising. In the conventional context-based advertising, advertisements are displayed based on user activity or the user generated text contents as a source of information about what the user is interested in or intends to do, and then using this information as the context such that relevant advertisements can be displayed based on user's current or past interest or intention. While this method is much more effective than non-context-based advertising for both consumers and advertisers, conventional methods are still mainly based on matching the keywords that occurs in the user generated text contents or web sites that the user visits and keywords that the advertisers pre-define as being relevant. A disadvantage of such conventional methods is that many relevant contexts can be missed because of the lack of keyword match.

For example, if a search query, or a user comment on a social network, or an email or an online chat message, or an SMS message, or a transcript from an audio or text conversation, etc., contains such words as "San Francisco hotels", advertisements from hotels in the San Francisco area may be displayed. However, if the query or the user comment contains such words as "stay in San Francisco", or "stay near Golden Gate Bridge", and if the hotel advertiser does not pre-define keywords such as "stay", "Golden Gate Bridge", etc., as relevant, their ads may not be displayed, even though they can be highly relevant to the context.

However, using the system and methods disclosed in the present invention, even if the hotel advertiser only pre-defines relevant words such as "hotel", by checking concepts such as "travel", or "San Francisco", etc, with their corresponding association datasets, which will likely contain terms such as "flight", "hotel", "car rental", "stay", "sightseeing", etc., the relevance between the user query or user comment and the hotel advertisement can be discovered, and the related ads can be displayed to achieve desired results.

For example, if a user typed in an email, or in an online chat or SMS, or on a social network site "We will stay in San Francisco for a few days", or "We prefer to stay near Golden Gate Bridge", the presently disclosed system and methods will treat these messages as the first text content, and search from the storage for a conceptual association dataset that are relevant to such text, such as "Travel", "San Francisco", etc., and calculate a relevance score between the first text content and the concepts. On the other hand, the system and methods will retrieve from its database of advertisements, and use their keyword lists or ads descriptions as the second text content, and calculate or use a pre-calculated or a stored relevance score of the second text contents with the concepts of "Travel", or "San Francisco", etc., and then calculate a relevance score between the first text content and the second text content using the methods described above. If there are advertisements with their keyword list or descriptions containing keywords such as "Hotel in San Francisco", or "Hotel, Golden Gate Bridge", etc., their relevance scores with the concepts of "Travel", or "San Francisco" will likely be above the threshold, and will likely be considered by the system as being relevant to the context represented by the user expressions, and the system can then display the advertisements to the user in a user interface. The advertisement can be displayed as a banner advertisement at a web user interface or in a promotional email, etc. In this case, users can be better served, and more economical-financial benefits to the advertisers can also be achieved when compared to the conventional advertising methods without using the presently disclosed system and methods.

For another example, if a user says in a social network site or in a chat or an email: "I don't cook everyday", a conventional keyword-matching advertising method will likely be unable to display advertisements related to cooked or packaged foods in this context, or restaurants of different styles. However, a conceptual association dataset for the concept of "cook" will likely contain property terms such as "dinner", "lunch", "cooked food", "packaged food", "restaurants", etc. the presently disclosed system and methods can detect the relevance of the user expression to the concept of "cook", and then calculate a relevance score of the keyword list or description of various advertisements to the concept of "cook", and then calculate a relevance score between the user expression and the advertisements, and display those advertisements that have a relevance score above a predefined threshold.

As is described above, in some embodiments, the relevance score between a single text content (such as the first text content as illustrated above) and the conceptual association dataset can be used to classify or categorize the text content into a document class or a category or a topic of interest defined by the conceptual association dataset. In some embodiments, the presently disclosed system and methods can further be used to detect user interest or intention, and to build a user profile for advertising and other purposes. For example, if a user expressed his/her travel plans and experiences in different place over a period of time, such as in the above examples with San Francisco/Golden Gate Bridge, etc., even though the specific places and time the user mentioned about his/her travel plans/experiences are different, such as one time for New York, and another time for Los Angeles, etc., when the concept of "travel" or a related concept is often found to be relevant to the user expression, a dynamic user profile can be built based on the frequency of such relevant concepts being invoked, and relevant advertisements can be displayed to the user even when the user is not specifically saying something about travel.

In some embodiments, a collection of user-generated contents comprising one or more text contents such as emails or comments entered on a social network or chat messages sent/received over a period of time is used as the first text content, and is compared with one or more conceptual association datasets using the methods described above, and their respective relevance scores (R1) are stored on a computing system's storage. For the concepts with relevance scores above a predetermined threshold, these concepts names can be used as topics of user interests even though the user may have never expressively mentioned the names of such topics, such as "travel", in the above example; and such topics can be added to the user profile. On the other hand, if a keyword in the keyword list or description of an advertisement matches a topic name in such a user profile, then the user can be a candidate of targeted advertising for the relevant advertisements, even though the user has never specifically disclosed such topics of interest in his/her user profile.

In some embodiments, the terms in a concept association dataset are the same as the terms selected from one of the text contents. In that case, the process of concept-matching becomes equivalent to a keyword-based matching. However, the unique methods for determining the term importance score in the first and second text contents as described with FIG. 8A-FIG. 11, still distinguish the present invention from conventional keyword matching even when the conceptual association dataset contains the same terms as a conventional keyword list, and can still produce more accurate results than conventional keyword matching.

It should be understood that the above-described methods are not limited to the specific examples used. Applications of the presently disclosed system and methods are not limited to the above examples, either. Configurations and processes can vary without deviating from the spirit of the invention.

What is claimed is:

1. A computer-implemented method for determining relevance, and for semantic search and personalized advertising based on association, comprising:
receiving a first text content, wherein the first text content comprises one or more terms each comprising a word or a phrase;
identifying a first term in the first text content, wherein the first term represents a topic or category name, wherein the topic or category name includes the name of a concept or object, or a product or service or activity or event, wherein the first term is a user-generated term;
receiving a dataset based on the topic or category name, wherein the dataset comprises one or more property names representing one or more properties associated with the topic or category name, wherein at least one of the one or more property names is associated with an association strength measure;
receiving a second text content, wherein the second text content comprises one or more terms each comprising a word or a phrase;
identifying a second term in the second text content, wherein the second term matches one of the one or more property names in the dataset, wherein the second term does not match the topic or category name, wherein the second term is associated with a term importance measure; and
determining a relevance measure between the first text content and the second text content based on the second term and the association strength measure and the term importance measure.

2. The method of claim 1, wherein at least one of the one or more property names is associated with an association strength measure, wherein the association strength measure is above a predefined threshold.

3. The method of claim 1, further comprising:
outputting the relevance measure.

4. The method of claim 1, further comprising:
displaying, in a user interface, the first text content or the second text content, or a representation of the first text content or the second text content.

5. The method of claim 1, wherein at least one of the first text content and the second text content includes or is associated with at least a user comment, a chat message entered on a website or on a social network page or in a user interface of a computing or communication device, an email, an SMS message, a blog, an article, a book, a transcript from an audio or text conversation, an advertisement, a description or a keyword list associated with an advertisement, a description of a product or service, a webpage.

6. The method of claim 1, wherein at least one of the first text content and the second text content comprises at least a portion of a patent or a patent publication or a patent draft or patent notes, a search query, a document associated with a search index, a resume, a job description.

7. The method of claim 1, further comprising:
storing the topic or category name in association with a user profile.

8. A computer-implemented method for determining relevance, and for semantic search and personalized advertising based on association, comprising:
receiving a first text content, wherein the first text content comprises one or more terms each comprising a word or a phrase;
identifying a first term in the first text content, wherein the first term represents a topic or category name, wherein the topic or category name includes the name of a concept or object, or a product or service or activity or event;
receiving a dataset based on the topic or category name, wherein the dataset comprises a plurality of property names representing a plurality of properties associated with the topic or category name, wherein there are at least two property names in the dataset each having an association strength value, wherein the plurality of property names are divided into a first group and a second group based on whether the association strength value is above or below a pre-defined threshold;

receiving a second text content, wherein the second text content comprises one or more terms each comprising a word or a phrase; and determining a relevance measure between the first text content and the second text content based on whether the second term matches a property name in the first group or in the second group.

9. The method of claim 8, further comprising:

outputting the relevance measure.

10. The method of claim 8, wherein at least one of the first text content and the second text content includes or is associated with at least a user comment, a chat message entered on a website or on a social network page or in a user interface of a computing or communication device, an email, an SMS message, a blog, an article, a book, a transcript from an audio or text conversation, an advertisement, a description or a keyword list associated with an advertisement, a description of a product or service, a webpage.

11. The method of claim 8, wherein at least one of the first text content and the second text content comprises at least a portion of a patent or a patent publication or a patent draft or patent notes, a search query, a document associated with a search index, a resume, a job description.

12. The method of claim 8, further comprising:

storing the topic or category name in association with a user profile.

13. The method of claim 8, wherein the matched property name in the dataset has an association strength value representing the strength of the association between the property name and the topic or category name, the method further comprising:

determining the relevance measure further based on the association strength value.

14. The method of claim 8, further comprising:

displaying, in a user interface, the first text content or the second text content, or a representation of the first text content or the second text content.

15. A computer-implemented method for determining relevance, and for semantic search and personalized advertising based on association, comprising:

receiving a topic or category name, wherein the topic or category name comprises a word or a phrase, wherein the topic or category name includes the name of a concept or object, or a product or service or activity or event;

receiving a dataset related to the topic or category name, wherein the dataset comprises a plurality of property names representing a plurality of properties associated with the topic or category name, wherein there are at least two property names in the dataset each having an association strength value, wherein the plurality of property names are divided into a first group and a second group based on whether the association strength value is above or below a pre-defined threshold;

receiving a text content containing one or more terms each comprising a word or a phrase;

identifying a first term in the text content; and determining a relevance measure between the text content and the topic or category name based on whether the first term matches a property name in the first group or in the second group.

16. The method of claim 15, further comprising: outputting the relevance measure.

17. The method of claim 15, wherein the text content is a user expression, wherein the user expression includes or is associated with a user comment or chat message entered on a website or on a social network page, or in a user interface of a computing or communication device, a search query, or an email, an SMS message, a blog, an article, a book, a patent, a resume or job description, a transcript from an audio or text conversation, the method further comprising:

associating the topic or category name with a user profile.

18. The method of claim 15, wherein the topic or category name is associated with a user profile, wherein the text content or its representation includes an advertisement or a recommendation or a description of a product or service or activity or event, or other objects including a web page, a blog or article or a book, the method further comprising:

displaying, in a user interface, the text content or its representation.

19. The method of claim 15, wherein the matched property name in the dataset has an association strength value representing the strength of the association between the property name and the topic or category name, wherein the relevance measure between the first text content and the second text content is determined, the method further comprising:

determining the relevance measure further based on the association strength value.

20. The method of claim 15, further comprising:

displaying, in a user interface, the topic or category name.

* * * * *